(12) United States Patent
Urade et al.

(10) Patent No.: US 7,090,944 B2
(45) Date of Patent: Aug. 15, 2006

(54) ALKALINE DRY CELL

(75) Inventors: Makoto Urade, Ibaraki (JP); Shoichiro Tateishi, Ibaraki (JP); Koji Koide, Ibaraki (JP); Shinichi Iwamoto, Ibaraki (JP); Minajuro Ushijima, Ibaraki (JP)

(73) Assignee: Hitachi Maxell, Ltd., Osaka-fu (JP)

( * ) Notice: Subject to any disclaimer, the term of this patent is extended or adjusted under 35 U.S.C. 154(b) by 0 days.

(21) Appl. No.: 10/836,256

(22) Filed: May 3, 2004

(65) Prior Publication Data

US 2004/0253506 A1 Dec. 16, 2004

Related U.S. Application Data

(62) Division of application No. 09/941,564, filed on Aug. 30, 2001, now abandoned.

(30) Foreign Application Priority Data

| Sep. 1, 2000 | (JP) | ............................ P2000-266336 |
| Sep. 1, 2000 | (JP) | ............................ P2000-266337 |
| Sep. 4, 2000 | (JP) | ............................ P2000-267701 |
| Aug. 10, 2001 | (JP) | ............................ P2001-244779 |

(51) Int. Cl.
*H01M 2/08* (2006.01)

(52) U.S. Cl. .................... 429/174; 429/171; 429/185

(58) Field of Classification Search ................ 429/174, 429/171, 185

See application file for complete search history.

(56) References Cited

U.S. PATENT DOCUMENTS

| 4,237,203 | A | 12/1980 | Tsuchida et al. |
| 5,272,020 | A | 12/1993 | Flack |
| 5,478,669 | A | 12/1995 | Flack |
| 6,224,640 | B1 * | 5/2001 | Tucholski ................... 29/623.2 |
| 6,312,850 | B1 | 11/2001 | Janmey |
| 6,333,124 | B1 | 12/2001 | Moriwaki et al. |
| 6,634,649 | B1 * | 10/2003 | Yamaguchi et al. ........ 277/634 |
| 2002/0081490 | A1 | 6/2002 | Ferraro et al. |
| 2004/0029002 | A1 * | 2/2004 | Sargeant et al. ............ 429/185 |

FOREIGN PATENT DOCUMENTS

CN 1236491 A 11/1999

* cited by examiner

*Primary Examiner*—John S. Maples
(74) *Attorney, Agent, or Firm*—Birch, Stewart, Kolasch & Birch, LLP

(57) ABSTRACT

The present invention discloses an alkaline dry cell containing a cathode and an anode, a separator and an electrolyte solution that are housed inside an external can, and a resin sealing member and a supporting member for supporting the sealing member with an inner circumferential side that are attached to an opening edge of the external can, wherein the opening edge of the external can is sealed by tightening the resin sealing member with the external can and the supporting member.

6 Claims, 15 Drawing Sheets

A STRESS DIRECTION BY A CAULKING PROCESS

ALKALINE DRY CELL

This application is a Divisional of prior application Ser. No. 09/941,564, filed on Aug. 30, 2001 (now abandoned), and for which priority is claimed under 35 U.S.C. § 120; and this application claims priority of Application Nos. 2000-266336 filed in Japan on Sep. 1, 2000; 2000-266337 filed in Japan on Sep. 1, 2000; 2000-267701 filed in Japan on Sep. 4, 2000 and 2001-244779 filed in Japan on Aug. 10, 2001 under 35 U.S.C. § 119; the entire contents of all are hereby incorporated by reference.

1. Field of the Invention

The present invention relates to a sealing technique of a cylindrical alkaline dry cell.

2. Description of the Background Art

<Entire Schematic Structure of a Cylindrical Alkaline Dry Cell>

For example, as illustrated in FIG. 15, a conventional cylindrical alkaline dry cell (dry battery) is provided with: a cathode 2 and an anode 4, a separator 3 placed between these electrodes, a nail-shaped anode collector rod 5 inserted into the anode 4 and an electrolyte solution (not shown) in which the separator 3 and the cathode 2 are impregnated, all of which are housed inside (cell chamber C) an external can 1 that has a cylindrical shape with a bottom lid and that also serves as a cathode terminal, and an opening edge 1a of the external can 1 is sealed so as to prevent the electrolyte solution inside the cell chamber C from leaking outside.

<A Thickness of External Can>

The outer diameter of a size "AA" alkaline dry cell that is one type of cylindrical alkaline dry cells is determined to 13.5 to 14.5 mm in the Japanese Industrial Standards (JIS standards), and the size of the battery holder in apparatuses using the battery is unified in such a manner that in fact, the outer diameter is standardized to 14.0±0.1 mm. In an attempt to increase the discharging capacity by increasing the inner volume (cell volume) of an alkaline dry cell with the outer diameter being limited, the can thickness of the external can is decreased. However, in the case when the thickness of the external can made of a killed steel (aluminum killed steel) that is generally used in alkaline dry cell is reduced, problems tend to arise in which a difficult machining process is required and the external can tends to be deformed during a transporting process of the external can or a transferring process at the time of assembling the battery. For this reason, even the thinnest can thickness of the external can of the size "AA" alkaline dry cell that are currently available in the domestic market is set to 0.18 mm.

<Structure of Sealing Member>

As illustrated in FIG. 16 in an enlarged manner, the sealing member in the cylindrical alkaline dry cell is provided with a resin sealing member 6 having a safety valve mechanism for preventing an abnormal rise of the inner pressure, that is, for preventing explosion, a supporting member 107 for supporting the resin sealing member 6 with the inner circumferential portion and an anode terminal plate (anode terminal) 207 formed in an upward sticking manner (hat shape) in the Figure. Among these members, the resin sealing member 6 is provided with a boss section 61 for holding the anode collector rod 5, an outer circumferential portion 62 that is made in contact with the inner circumferential face of the external can 1, and a connecting portion 63 for connecting the boss section 61 and the outer circumferential section 62 with an anti-explosion thin portion (actuating point of the safety valve) 63a being placed on one portion thereof. Here, in the case when the inner pressure of the battery, that is, the pressure inside the cell chamber C, exceeds a predetermined level, the connecting section 63 is deformed in a swelling manner, for example, as indicated by a chain line in the Figure, and when the inner pressure further increases, the anti-explosion thin portion 63a is ruptured (that is, the safety valve is actuated) as illustrated in FIG. 17, with the result that the inner pressure is released outside. Moreover, the resin sealing member 6 prevents the electrolyte solution from leaking by blocking the upper portion of the cell chamber C, as well as electrically insulating between the external can 1 forming the cathode collector and the anode terminal plate 207 forming the anode collector terminal. Here, in FIG. 16 and FIG. 17, reference numerals 107f and 207f respectively show gas releasing holes for externally releasing gas generated inside the cell chamber C.

In the resin sealing member 6 of this type, the outer circumferential portion 62 thereof, located between the supporting member 107 and the external can 1, is tightened inward together with the circumferential edge of the opening edge 1a of the external can 1, and then caulked so that it is attached inside the opening edge 1a of the external can 1 (in this specification, such a sealing method is referred to as "sealing process by lateral tightening" or "lateral tightening sealing process"). In this case, in the case when the caulking force is weak, even though the electrolyte solution (a strong alkaline solution mainly composed of potassium hydroxide) inside the battery is not allowed to leak for the initial time, as the closely contacting property between the sealing member 6 and the external can 1 reduces due to the succeeding temperature changes, etc., the electrolyte solution inside the battery gradually leaks outside through the border portion between the sealing member 6 and the external can 1. For this reason, in the conventional cylindrical alkaline dry cell, a metal washer (a disc-shaped metal plate having a hole in the center) having a predetermined thickness (in general, approximately 0.6 to 0.75 mm) is used as the supporting member 107 that supports the sealing member 6 with the inner circumferential side, with the result that, upon tightening the outer circumferential section 62 of the sealing member 6, the metal washer is used for firmly backing up the tightening process from the inside thereof so that the outer circumferential section 62 of the sealing member 6 can be caulked with a sufficient force from outside together with the opening edge 1a of the external can 1.

<Subject 1 (Common Subject)>

In the above-mentioned cylindrical alkaline dry cell, one proposed method for increasing the charging capacity is to increase the inner volume of the battery. The respective inventions of the present application have a common objective for increasing the charging capacity by increasing the battery inner volume, and with this objective as the premise, attempts are made to solve the subjects described below.

<Subject 2>

First, the inventors, etc. of the present invention tried to use a thin external can having a thickness of not more than 0.18 mm so as to increase the charging capacity by increasing the inner volume in a size "AA" alkaline dry cell that is one type of cylindrical alkaline dry cell. Consequently, various revising means are given so that, with respect to the difficulty in forming the external can and the problem of deformation at the time of transportation that have been described, it becomes possible to solve these problems. However, in the case when the thickness of the external can is set to be thinner than 0.18 mm, since the caulking strength of the sealing member is reduced, a new problem arises in which the inner electrolyte solution leaks from the sealing portion. Upon assembling a battery, the sealing member 6 to which the anode collector rod 5, the anode terminal plate 207, etc. have been assembled, is inserted into the opening edge 1*a* of the external can 1, and in this state, the outer circumferential portion 62 of the sealing member 6 is tightened by the external can 1 from the outer circumferential side as well as by the metal washer (metal plate) 107 with the inner circumferential side, and then caulked so that it is attached to the inside of the opening edge 1*a* of the external can 1. In this case, the sealing member is deformed so that the outer circumferential portion 62 of the sealing member 6 is pressed onto the inner face of the external can 1 by its elastic force, and allowed to closely contact it. Consequently, gaps caused by fine irregularities located on the surface (contact face to the external can 1) of the outer circumferential portion 62 of the sealing member 6 are filled so that it is possible to prevent a strong alkaline solution (electrolyte solution) with a strong creeping property, stored inside the battery, from leaking outside.

However, in the case when a thin external can having a thickness of not more than 18 mm, since the strength of the external can 1 decreases to an extent corresponding to the reduced thickness, the external can 1 fails to suppress the deformation of the resin sealing member, with the result that the electrolyte solution inside the battery comes to leak outside through the fine irregularities between the resin sealing member. In particular, when the battery is subjected to an abrupt temperature change, the leak of the electrolyte solution tends to occur due to the swell and shrinkage of the material. In the anti-leakage solution test carried out by the present inventors, etc., more specifically, tests in which a battery has been stored in a thermostat that repeats temperature changes between −10° C. and 60° C. every 30 minutes for three days, and this is then observed as to the presence or absence of leak from the sealing portion, it has been recognized that the solution leakage occurs when the thickness of the external can is set to not more than 0.18, and this problem has not been solved by the conventional method.

In the present invention, even in the case when an external can having a thickness of not more than 0.18 mm is used so as to increase the charging capacity, it is possible to prevent the electrolyte solution inside the battery from leaking outside even upon application of an abrupt temperature change thereon. This is one of the objectives of the present invention.

<Subject 3>

Next, in order to increase the inner volume of the battery, the inventors, etc. of the present application have taken a close look at the thickness of the sealing member. Here, in the cylinder-type alkaline dry cell, since the structure in which the center portion of the anode terminal plate 207, that is, the portion of the terminal face, is shaped into a protruding form has been the standard structure, the conventional sealing structure, shown in FIG. 15 and FIG. 16, that has a metal washer as the supporting member 107 for supporting the outer circumferential portion 62 of the sealing member 6 (hereinafter, reference numeral 107 is also used as the metal washer, if necessary) comes to have two upper and lower void portions in the height direction with the metal washer 107 interpolated in between, that is, a space S1 on the connecting section 63 side of the sealing member 6 and a space S2 on the anode terminal plate 207 side. Of these, the former space S1 is a necessary portion for allowing the deformation of the connecting portion 63 of the sealing member 6 or its thin portion 63*a* resulting from an increase in the inner pressure; however, the latter space S2 is formed because of the fact that the anode terminal plate 207 has a protruding shape toward the surface side, and is a wasteful portion that can be eliminated originally. Since such a wasteful space S2 is located on the sealing member, the conventional sealing structure tends to have an unnecessary thickness of the sealing portion as a whole, resulting in a problem of a limited volume of the cell chamber C to be filled with a battery activating substance directly related to the charging capacity, that is, a limited inner volume of the battery.

Here, in order to prevent the volume of the sealing portion from becoming unnecessarily large, a possible proposal is to eliminate the metal washer 107 and to utilize the anode terminal plate 207 instead as the supporting member for supporting the sealing member 6 from the inside portion. However, from the viewpoint of manufacturing costs, a member that is thinner than the metal washer 107 (normally, one having a thickness of 0.4 mm) is used as the anode terminal plate 207; therefore, when the above-mentioned method is adopted, the anode terminal plate 207 is deformed upon caulking the sealing member 6, resulting in an insufficient force for tightening the outer circumferential portion 62 of the sealing member 6. For this reason, upon application of an abrupt temperature change, etc., to the battery, the inner electrolyte solution might leak outside through the gap between the external can 1 and the sealing member 6.

In the present invention, in the cylindrical alkaline dry cell having the resin sealing member, only one sheet of a metal plate that also serves as the anode terminal plate (anode terminal) is used as the supporting member supporting the sealing member with the inner circumferential portion, and the shape of the outer circumferential portion of this is also devised; thus, it is possible to prevent the thickness or the volume of the sealing portion from becoming unnecessarily large, and also to prevent the electrolyte solution inside the battery from leaking outside even in the event of a temperature change, etc. This arrangement is also one objective of the present invention.

<Subject 4>

Moreover, in the case when only the anode terminal plate is used as the supporting member for supporting the sealing member 6 with the inner portion, after the sealing portion has been formed by the caulking process, deviations tend to occur in the height of the anode terminal plate. This phenomenon of height deviations will be discussed below in detail. Here, as will be described later, a bent portion (curved portion) having an angle greater than 90 degrees with an average curvature radius of not more than 1 mm is placed on the outer circumferential portion of the anode terminal plate as will be described later, the caulking portion is desirably formed through a process curing, thereby making it possible to prevent the inner strong alkaline electrolyte solution from leaking outside; therefore, the following description will be given by exemplifying the case in which the anode terminal plate having the curved portion on the outer circumferential portion.

FIG. 11 shows one example of such an anode terminal plate. The anode terminal plate 307, shown in the Figure, is provided with three areas including a terminal face 377 that comes into contact with the terminal of a battery applied apparatus to supply power thereto, a side face 379 of this terminal face 377 and a flange face 378. In the case when the curved portion is placed on the outer circumferential portion of the anode terminal plate 307, the flange face 378 is classified into a portion having been subjected to the curving process (a curved portion 378b) and a comparatively flat portion (a flange face flat portion) 378a.

In the process for sealing the opening of an alkaline dry cell, the external can is plastically deformed by caulking so as to tighten the resin sealing member sandwiched between the anode terminal plate 307 and the external can, and at this time, a stress component toward the radial direction is applied onto the anode terminal plate 307. This stress causes the anode terminal plate 307 to deform; however, this deformation takes place at a crossing point serving as a starting point between a face that is in parallel with the stress and a face having an angle close to 90 degrees with respect to the stress, and in FIG. 11, the deformation takes place with point A (a crossing point between the terminal face 377 and the side face 379 of the terminal face) and point B (a crossing point between the terminal face side face 377 and the flange face flat portion 378a) serving as fulcrums. The deformation causes point B to become higher than the original position, or causes point B to become lower than it, resulting in a difference in height in the anode terminal plate 307 between the two cases. As to whether the height of the anode terminal plate 307 becomes higher or lower than the height before the caulking process, it depends on a slight difference of conditions of the sealing process, and is consequently instable with chaotic variations.

Deviations in the height of the battery cause problems. For example, if there is a deviation in height on one battery is 0.5 mm, the maximum deviation of an apparatus housing six batteries in series with each other is 3 mm in the total length of the battery heights, with the result that the collector function of the apparatus is not properly exerted or the apparatus might fail to properly house the batteries. For this reason, for example, in the case of the size "AA" alkaline dry cell that are commercially available in the domestic market, the height of the batteries is set within the range of 50.00 mm±0.05 mm.

In the present invention, in the case when an anode terminal plate is used as the supporting member for supporting the resin sealing member with the inner circumference portion in the alkaline dry cell having the resin sealing member, deviations in dimension due to the deformation in the anode terminal plate in the sealing process is reduced as small as possible. This is one of the objectives of the present invention.

<Subject 5>

As described earlier, upon assembling an alkaline dry cell, the resin sealing member 6 to which an anode collector rod 5, an anode terminal plate 207, etc. have been assembled is inserted into the opening edge 1a of the external can 1, and in this state, the outer circumferential portion 62 of the sealing member 6 is tightened by the external can 1 from the outer circumferential portion, and is also tightened by the metal washer (metal plate) 107 with the inner circumferential portion, and then caulked so that it is attached inside the opening edge 1a of the external can 1. At this time, the resin sealing member is deformed, and the outer circumferential portion 62 of the sealing member 6 is pressed onto the inner face of the external can 1, and closely made in contact therewith.

However, in the conventional sealing construction in which the thickness of the connecting portion 63 is comparatively thin, and its portion on the outer circumferential section 62 and its portion on the boss section 61 side do not have so much a difference in the thickness, the sealing member 6 or its connecting section 63 is greatly deformed as a whole at the time of the sealing process by the lateral tightening operation, resulting in an excessive load on the anti-explosion thin portion (the actuation point of the safety valve) 63a in the connecting section 63, that is, a problem of too much stress on the corresponding thin portion 63a.

In the present invention, during such a lateral tightening operation at the time of the sealing process, the stress exerted on the anti-explosion thin portion is reduced so that it is possible to improve the reliability of the thin portion functioning as the safety valve. This is also one objective of the present invention.

<Subject 6>

In the alkaline dry cell provided with the resin sealing member 6, when the safety valve is operated properly, the inner gas is externally released through the gas releasing holes 107f and 207f placed in the metal washer 107 and the anode terminal plate 207. In the safety valve, the connecting portion to the sealing member 6 is deflected upward by an increase in the inner pressure of the battery, and when the inner pressure exceeds a predetermined pressure, the anti-explosion thin portion 63a formed in the connecting portion 63 is ruptured so that it is actuated.

However, in the conventional sealing member structure, the thickness of the connecting portion 63 is comparatively thin, and there is not so much difference in thickness between the portion on the outer circumferential 62 side and the portion on the boss section 61 side; therefore, for example, in the event of a short-circuiting heat generation, the resin of the sealing member comes to soften, allowing the connecting section 63 to extend before the actuation of the safety valve to block the gas releasing hole 107a of the metal washer 107, or in the case when the anode terminal plate 207 is used as the metal washer in the supporting member, allowing it to contact the anode terminal plate 207 to prevent the inner gas from being smoothly released. Moreover, in the event of an excessive discharging state, the safety valve fails to function properly, causing the sealing member 6 to rupture with the contents scattering with a big rupturing noise.

SUMMARY OF THE INVENTION

In the present invention, the shape of the resin sealing member is modified so that the safety valve is allowed to operate normally, thereby improving the safety in the event of a short-circuiting heat generation and an excessive discharging state. This is also one objective of the present invention.

<Invention Relating To Item 1>

When the thickness of the external can is reduced, the inner volume of the battery increases, while the strength in the sealing portion decreases. However, since the thickness of the can in the sealing portion is independent of the inner volume of the battery, the inventors, etc. of the present invention have made a research as to whether or not the caulking strength of the sealing portion can be maintained by making the can thickness in the sealing portion thicker than the can thickness in the trunk portion. In order to manufacture such a can having a difference in the thickness, it is necessary to use an original steel plate that has a thickness as thick as or thicker than the thick portion of the can. Here, in the case of a can having a difference in thickness between the sealing portion and the trunk portion, the greater the rate of the thickness, the greater the amount of plastic deformation of the trunk portion, resulting in a strong process curing during the process; and the inventors, etc. of the present invention consider that such a process curing in the trunk portion will give a desired influence on the caulking process in the sealing portion.

In this manner, after having made extensive research efforts on the thickness of the external can used for the size "AA" alkaline dry cell, the inventors, etc. of the present invention have found that by making the thickness of the can in the sealing portion thicker than the thickness of the can in the trunk portion to a certain extent, it is possible to maintain the caulking strength in the sealing portion, and consequently to prevent the leaking phenomenon of the solution due to temperature changes. Here, in particular, by making the thickness of the can in the sealing portion not less than 1.4 times greater than the thickness of the can in the trunk portion, it becomes possible to sufficiently maintain the caulking strength of the sealing portion, and consequently to positively prevent the leaking phenomenon of the solution due to temperature changes.

The present invention, which has been devised through the above-mentioned research efforts, is provided as an alkaline dry cell that is provided with: a cathode 2 and an anode 4, a separator 3 placed between these electrodes and an electrolyte solution that are housed inside an external can 1 having a cylindrical shape with a bottom as shown in FIG. 1, and a resin sealing member and a supporting member 7 for supporting the sealing member with the inner circumferential portion are attached to an opening edge 1a of an external can 1 with the opening being sealed by tightening the resin sealing member 6 with the external can 1 and the supporting member 7. This arrangement features that the thickness of the trunk portion B of the external can 1 is made thinner than 0.18 mm, and that the thickness of the sealing portion A of the external can 1 is made 1.4 times greater than the thickness of the trunk portion. Moreover, as the thickness of the can base steel plate becomes greater, it requires more costs to make the thickness of the can (the thickness of a wall face forming the can) thinner in the ironing; therefore, the ratio of "the thickness of the sealing portion A"/"the thickness of the trunk portion B" is preferably set not more than 2.5. The thickness of the trunk portion B of the external can 1 is preferably set to not less than 0.1 mm so as to ensure a predetermined strength.

<Invention Relating To Items 2, 3, 4>

In an alkaline dry cell having the resin sealing member, in the case when a metal plate that also serves as an anode terminal plate as the supporting member for the sealing member is used as the supporting member for the sealing member, when the strength of a metal plate (anode terminal plate) located inside is weak when the sealing member is caulked, the force pressing the resin sealing member becomes weak, resulting in a state where the electrolyte solution leaks between the sealing member and the external can. Therefore, the inventors, etc. of the present invention carry out a specific curving process on the outer circumferential portion of the metal plate, thereby improving the process curing of the metal plate as well as increasing the contact area between the metal plate and the resin sealing member; thus, it is possible to solve the above-mentioned subject 1 and subject 3.

In other words, as illustrated in FIG. 1 and FIG. 2, the present invention is devised as an alkaline dry cell that is provided with: a cathode 2 and an anode 4, a separator 3 placed between these electrodes and an electrolyte solution (not shown) that are housed inside an external can 1 having a cylindrical shape with a bottom, and a resin sealing member 6 and a supporting member supporting for the sealing member with the inner circumferential portion are attached to the inside of an opening edge section 1a of the external can 1, and by tightening the resin sealing member 6 with the external can 1 and the supporting member so that the opening is sealed. This arrangement features that a sheet of metal plate 7 that also serves as an anode terminal plate (hereinafter, also referred to as an anode terminal plate 7) is used as the supporting member, and that along all the outer circumferential portion of the anode terminal plate 7, as a portion for sandwiching the resin sealing member 6 together with the external can 1, a curved portion 78b, which has an average curvature radius of not more than 1 mm and shows a C-letter shape or an arc shape in a cross-section obtained when the anode terminal plate 7 is cut in the thickness direction through the center thereof, is installed. Here, as will be described later, the average curvature radius r of the curved portion 78b is referred to as a radius of a circle that, with respect to a curve that traces the outer circumference of the cross-section of the curved portion 78b, allows the total of distances from respective points on the curve to become a minimum (see FIGS. 5 to 7).

More specifically, for example, as illustrated in FIG. 5, along the entire outer circumferential portion of the anode terminal plate (metal plate) 7 made of a sheet of steel plate, a curved portion 78b, which is formed into a curved shape with an average curvature radius of not more than 1 mm and shows virtually a C-letter shape or an arc shape over an angle range greater than 90 degrees in a cross-section obtained when the anode terminal plate 7 is cut in the thickness direction through the center thereof, is installed.

The strength of the anode terminal plate 7 that is increased by process curing is considered to increase as the value, obtained by integrating the amounts of deformation over the entire area in respective fine areas provided when the anode terminal plate 7 is hypothetically divided into fine areas, becomes greater. Therefore, when the curvature radius of the bent portion (curved portion 78b in the present invention) becomes too great, the amount of deformation in the fine area becomes small so that it is not possible to obtain the strength increase due to the process curing; in contrast, when the curvature radius of the bent portion becomes too small, the total volume of the deformed portion is small although the local amount of deformation becomes great, with the result that no strength increase by the process curing is expected. From experiments, it was found that in the case of the curvature radius of 0.1 to 1.0 mm, the strength increase due to plastic deformation became greater.

Moreover, as the angle of the curved portion 78b becomes greater, the volume of the area having deformation increases; therefore, it is preferable since the strength increase by the process curing becomes greater. In the case when the angle is not more than 90 degrees, the edges of the metal plate 7 have an expanded shape like a "ʌ"-letter shape, and the sealing portion tends to come off when the battery inner pressure increases abnormally; therefore, the angle is preferably set to not less than 90 degrees. However, when the angle of the curved portion 78b of the anode terminal plate 7 exceeds 180 degrees, it becomes impossible to carry out the press machining, resulting in an increase in costs; therefore, the angle is preferably set to not more than 180 degrees.

As the angle range in which the curved portion 78b comes into contact with the sealing member 6 becomes greater, it becomes more desirable since the area for preventing the solution from leaking becomes greater. It is more preferable to set the angle greater than 90 degrees that is the lower limit value of the angle in which the aforementioned curved portion 78b of the anode terminal plate 7 is installed.

However, the degree exceeding 180 degrees fails to press the anode terminal plate 7 and the resin sealing member in the normal sealing edge system, making the members meaningless.

Here, when, for example, as illustrated in FIG. 5, the curved portion 78b is approximated by a hypothetical circle having the above-mentioned average curvature radius r as its radius, the angle range in which the curved portion 78b 5 is installed is referred to as an angle θ1 made by both of the ends of the curved section 7c with respect to the center O of the circle as the reference. Moreover, in the same manner, when the curved portion 78b is approximated by a hypothetical circle having the above-mentioned average curvature radius r as its radius, the angle range of the portion at which the curved portion 78b and the sealing member 6 come into contact with each other is referred to as an angle θ2 made by both of the ends of the contacting portion of the curved portion 78b to the sealing member 6 with respect to the center O of the circle as the reference.

In the present invention, with respect to the above-mentioned anode terminal plate (metal plate) 7, a plated steel plate having a thickness of approximately 0.4 mm is normally used. This is because in the present invention, the metal plate, which is a supporting member of the sealing member, also serves as the anode terminal plate, and a plated steel plate having the above-mentioned thickness, which is advantageous in costs, is generally used as the anode terminal plate.

In order to allow the metal plate having a function as the supporting member for supporting the sealing member 6 to also have a function as the anode terminal plate, that is, in order to allow the anode terminal plate 7 made by a metal plate to have a function for the supporting member, the portion on the center side (hereinafter, referred to as a terminal face) of the metal plate 7 forming the anode terminal face is formed in a protruding shape in the direction from the inner face side toward the outer face side, that is, a hat shape as a whole, in the same manner as the normal anode terminal plate. In other words, the metal plate 7 that also serves as the anode terminal plate has a hat shape as a whole; however, it also has the curved portion 78b on the outer circumferential portion, which has virtually a C-letter shape or an arc shape in its cross-sectional shape in the thickness direction, and the average curvature radius r of the curved portion 78b is set to not more than 1 mm, and the metal plate 7 comes into contact with the sealing member 6 within the above-mentioned angle range in the curved portion 78b.

<Invention Relating To Items 5, 6 and 7>

In order to achieve the above-mentioned subject 1 and subject 4, the inventors, etc. of the present invention have made research efforts as to the condition which, in an alkaline dry cell using the anode terminal plate as the supporting member for the resin sealing member, allows the height of the anode terminal plate to become either higher or lower than the height before and after the sealing edge process. As a result, it is found that with the arrangement in which the flange face flat portion is not placed in parallel with the terminal face, but placed in a slanted manner, it is possible to control which shape the anode terminal plate should form. In other words, by allowing the flange face to have a slant so that the angle made by the flange face flat portion and the terminal face side face becomes greater, it is possible to always keep the height of the anode terminal plate after the sealing edge process higher than the original height, and in the case of the reversed slant, it is possible to always keep the height of the terminal plate lower than the original height.

More specifically, for example, as illustrated in FIG. 1 and FIG. 2, in an alkaline dry cell that is provided with: a cathode 2 and an anode 4, a separator 3 placed between these electrodes and an electrolyte solution (not shown) that are housed inside an external can 1 having a cylindrical shape with a bottom, and a resin sealing member 6 and a supporting member 7 supporting the sealing member with the inner circumferential portion are attached to an opening edge 1a of an external can 1 with the opening being sealed by tightening the resin sealing member 6 with the external can 1 and the supporting member 7, the present invention is designed to have the following arrangement. In other words, an anode terminal plate 7 (indicated by the same reference numeral as the supporting member), for example, as shown in FIG. 3 and FIG. 4, is used as the supporting member. This anode terminal plate 7 is provided with a terminal face 77 having a protruding shape placed in the center, and an outer circumferential flange face 78 formed in a manner surrounding the terminal face 77 when viewed in a direction vertically penetrating the terminal face 77. Further, a flat portion (flange face flat portion) 78a is formed on the inner circumferential side of the flange face 78, and the flange face flat portion 78a and the terminal face 77 are set so as not to be in parallel with each other. In this case, the angle a made by the terminal face 77 of the anode terminal plate 7 and the flange face flat portion 78a is preferably set to not less than 4 degrees, more preferably, in the range of 4 to 20 degrees. This is because, when the angle a made by the terminal face 77 and the flange face flat portion 78a is greater than 4 degrees, the height of the anode terminal plate 7 after the sealing edge process uniformly becomes higher than the original height, while when the angle a exceeds 20 degrees, the height of the anode terminal plate 7 becomes greater, causing an adverse effect on the degree of freedom in designing.

Here, in the present specification, the flange face flat portion 78a is not necessarily limited to a flat face having an infinite curvature, and may be a moderate curved face with a great curvature radius. In this case, the slant of the flange face flat portion 78a is referred to as an angle a made by a plane connecting the two inflection points placed on both of the edges of the curved face and the terminal face 77 (see FIG. 4).

<Invention Relating To Item 8>

In an alkaline dry cell using an anode terminal plate as the supporting member for the resin edge sealing member, the reason for the fact that at the time of a lateral sealing edge process, an excessive load is imposed on the anti-explosion thin portion placed on the resin sealing member is because in the conventional sealing member, the thickness of the connecting portion is comparatively uniform except for the anti-explosion thin portion so that the stress exerted on the connecting section is received by the entire portion of the corresponding connection portion, thereby allowing the stress to concentrate on the anti-explosion thin portion.

Therefore, in order to solve the subject 1 and subject 5, in an alkaline dry cell using the anode terminal plate as the supporting member of the resin sealing member, the present invention is provided with a stress absorbing section having a relatively thin thickness that absorbs one portion of a stress applied in the lateral tightening sealing edge process and that is placed in the connecting portion of the sealing member; thus, it is possible to prevent a stress concentration onto the anti-explosion thin portion. More specifically, for example, as illustrated in FIG. 1, in an alkaline dry cell that is provided with: a cathode 2 and an anode 4, a separator 3 placed between these electrodes and an electrolyte solution (not shown) that are housed inside an external can 1 having a cylindrical shape with a bottom, and a resin sealing member 6 and a supporting member 7 supporting the sealing member with the inner circumferential portion are attached to an opening edge 1a of an external can 1 with the opening being sealed by tightening the resin sealing member 6 with the external can 1 and the supporting member 7, the present invention is designed to have the following arrangement.

In other words, first, in order to increase the charging capacity, a sheet of metal plate (anode terminal plate 7) that also serves as the anode terminal plate 7 is used as the above-mentioned supporting member as illustrated in FIG. 2 in an enlarged manner. Moreover, with respect to the above-mentioned resin sealing member 6, a boss section 61 holding an anode collector rod 5 to be inserted to the center portion of the anode 4, an outer circumferential portion 62 which is supported by the anode terminal plate (supporting member 7) from the inner circumferential side so as to contact the inner circumferential face of the external can 1, and a connecting portion 63 for connecting the boss section 61 and the outer circumferential portion 62 are installed therein. An anti-explosion thin portion 63a is installed on the foot portion on the boss section 61 side in the connecting portion 63 of the resin sealing member 6. Further, in order to reduce the load to the anti-explosion thin portion 63a at the time of the lateral tightening sealing process, a stress absorbing portion 63c, which absorbs one portion of the stress exerting on the connecting section 63 so as not to allow the stress to concentrate on the anti-explosion thin portion 63a when the resin sealing member 6 is tightened to seal the opening edge 1a of the external can 1, is placed on the foot portion on the outer circumferential portion 62 side in the connecting portion 63. This stress absorbing portion 63c is formed in such a manner that its thickness becomes thinner discontinuously as compared with a portion 63d positioned right inner circumferential side thereof, with a step difference placed between it and the portion 63d positioned right inner circumferential side thereof.

<Invention Relating To Item 9>

The reason for the fact that the safety valve is not properly actuated in the resin sealing member at a high temperature due to a short-circuiting heat generating time and at an excessive discharging time is that prior to the actuation of the safety valve, that is, prior to the rupture of the anti-explosion thin portion in the connecting portion, the connecting portion of the sealing member comes to swell in a large dome shape, and in this state, this comes to contact the metal washer or the anode terminal plate (in the case of no metal washer installed). In other words, the anti-explosion thin portion in the connecting portion of the sealing member originally should be ruptured prior to the contact to the metal washer or the anode terminal plate; however, since the thickness of the connecting portion of the sealing member is deformed into a dome shape due to the fact on its shape or structure that the thickness of the connecting portion of the sealing member is comparatively thin as a whole, the connecting portion, swelled into the dome shape, comes to rupture prior to the rupture of the thin portion.

Therefore, in order to solve the above-mentioned subject 1 and subject 6, the present invention, which relates to an alkaline dry cell using the anode terminal plate as the supporting member for the resin sealing member, has an arrangement in which the shape of the resin sealing member is modified so that the safety valve is actuated normally, thereby improving the safety in the event of a short-circuiting high temperature and at an excessive discharging time. More specifically, as illustrated in FIG. 1, the present invention, which relates to an alkaline dry cell that is provided with: a cathode 2 and an anode 4, a separator 3 placed between these electrodes and an electrolyte solution (not shown) that are housed inside an external can 1 having a cylindrical shape with a bottom, and a resin sealing member 6 and a supporting member 7 supporting the sealing member with the inner circumferential portion are attached to an opening edge 1a of an external can 1 with the opening edge 1a of the external can 1 being sealed by tightening the resin sealing member 6 with the external can 1 and the supporting member, is designed to have the following arrangement.

In other words, first, in order to increase the charging capacity, a sheet of metal plate 7 (anode terminal plate 7) that also serves as the anode terminal plate 7 is used as the above-mentioned supporting member as illustrated in FIG. 2 in an enlarged manner. Moreover, with respect to the above-mentioned resin sealing member 6, a boss section 61 holding an anode collector rod 5 to be inserted to the center portion of the anode 4, an outer circumferential portion 62 which is supported by the anode terminal plate (supporting member) 7 from the inner circumferential side so as to contact the inner circumferential face of the external can 1, and a connecting portion 63 for connecting the boss section 61 and the outer circumferential portion 62 are installed therein. An anti-explosion thin portion 63a is installed on the foot portion on the boss section 61 side in the connecting portion 63 of the resin sealing member 6. This thin portion 63a is formed in such a manner that its thickness becomes thinner discontinuously as compared with a portion 63b positioned right outer circumferential side thereof in a manner so as to surround the thin portion, with a step difference placed between it and the portion 63b positioned outside thereof.

<Respective Inventions Relating To Items 10, 11>

The respective inventions relating to items 10 and 11 are intended to further improve the reliability of the safety valve by combining the two inventions of items 8 and 9. In other words, in an alkaline dry cell having a resin sealing member 6 provided with the above-mentioned boss section 61, outer circumferential section 62 and connecting portion 63, the inventions feature that an anti-explosion thin portion 63a is installed on the foot portion on the boss section 61 side in the connecting portion 63 of the resin sealing member 6 in a manner so as to have a thickness that becomes discontinuously thinner as compared with a first thickness portion 63b located right outside this in a manner so as to surround this with a step difference from the first thickness portion 63b, and that a stress absorbing portion 63c, which absorbs one portion of the stress exerting on the connecting section 63 so as not to allow the stress to concentrate on the anti-explosion thin portion 63a when the resin sealing member 6 is tightened to seal the opening edge 1a of the external can 1, is placed on the foot portion on the outer circumferential portion 62 side in the connecting portion 63. This stress absorbing portion 63c is formed in such a manner that its thickness becomes thinner discontinuously as compared with a second thickness portion 63d positioned right inner circumferential side thereof, with a step difference placed between it and the second thickness portion 63d.

In this case, the thickness of the first thickness portion 63b is preferably set to 0.4 to 0.5 mm, and the second thickness portion 63*d* is preferably set to 2.5 to 3.0 times greater than the first thickness portion 63*b* (item 11). In a size "AA" alkaline dry cell using an anode terminal plate 7 as the supporting member of the resin sealing member 6, the deflection amount (amount of displacement) required for the connecting portion 63 of the sealing member 6 to come into contact with the anode terminal plate 7 is set to 1.2 mm. In the resin sealing member (for example, 6,6 nylon sealing member) 6, if each thickness of the first thickness portion 63*b* and the second thickness portion 63*d* is set to be comparatively thicker as described above, then, under a temperature condition in the range of 150 to 200° C., the deflection amount of the connecting portion 63 is set to not more than 1.2 mm, and the inner stress of the connecting portion 63 is set to not more than 100 mm Ns (approximately 60%, as compared with the conventional structure). Thus, even at high temperatures (150 to 200° C.), it becomes possible to prevent the sealing member 6 from swelling into a dome shape to touch the anode terminal plate 7 and the sealing member 6 from rupturing at an excessive discharging time prior to the rupture of the anti-explosion thin portion 63*a*.

EFFECTS OF THE INVENTION

<Invention Relating To Item 1>

In accordance with the invention relating to item 1, the can thickness of the sealing edge portion of the external can is set to not less than 1.4 times the can thickness of the trunk portion; therefore, even when the thickness of the trunk portion of the external can is set to not more than 0.18 mm, it becomes possible to positively prevent the solution leaking phenomenon due to temperature changes. Therefore, even in the case of an alkaline dry cell in which the trunk portion of the external can is made thinner to increase the battery inner capacity and consequently to increase the discharging capacity, it is possible to ensure a desired leaking resistant property.

<Inventions Relating To Items 2, 3 and 4>

In accordance with the inventions relating to items 2, 3 and 4, in a cylinder type alkaline dry cell provided with a resin sealing member, only one sheet of metal plate that also serves as an anode terminal is used as a supporting member for supporting the sealing member with the inner circumferential side, and a predetermined curved portion is formed on the outer circumferential portion of this; therefore, it is possible to increase the actual inner capacity of the battery, and also to improve the leaking resistant property (liquid-sealing property or sealing property). Consequently, it becomes possible to achieve an alkaline dry cell with a high capacity that is free from solution leakage even under temperature changes, etc.

<Inventions Relating To Items 5, 6 and 7>

In accordance with the inventions relating to items 5, 6 and 7, in an alkaline dry cell provided with the resin sealing member, in the case when an anode terminal plate is used as the supporting member for supporting the resin sealing member with the inner circumferential side, even if the anode terminal plate is deformed in the sealing edge process, it is possible to reduce deviations in the dimension in the height direction of the battery due to the deformation.

<Invention Relating To Item 8>

In accordance with the invention of item 8, in an alkaline dry cell provided with the resin sealing member, it is possible to prevent a stress concentration onto the anti-explosion thin portion in the sealing member at the time of a lateral tightening sealing edge process, and consequently to reduce the load imposed on the thin portion.

<Invention Relating To Items 9, 10, 11>

In accordance with the inventions relating to items 9, 10 and 11, in an alkaline dry cell provided with a resin sealing member, it is possible to prevent the rupturing of the sealing member and the resulting scattering of the contents and generation of a big rupturing noise and the blocking of the gas releasing hole by the sealing member, and consequently to improve the reliability of the safety vale and the safety.

For a fuller understanding of the nature and advantages of the invention, reference should be made to the ensuing detailed description taken in conjunction with the accompanying drawings.

DESCRIPTION OF THE PREFERRED EMBODIMENTS

Figure 1:
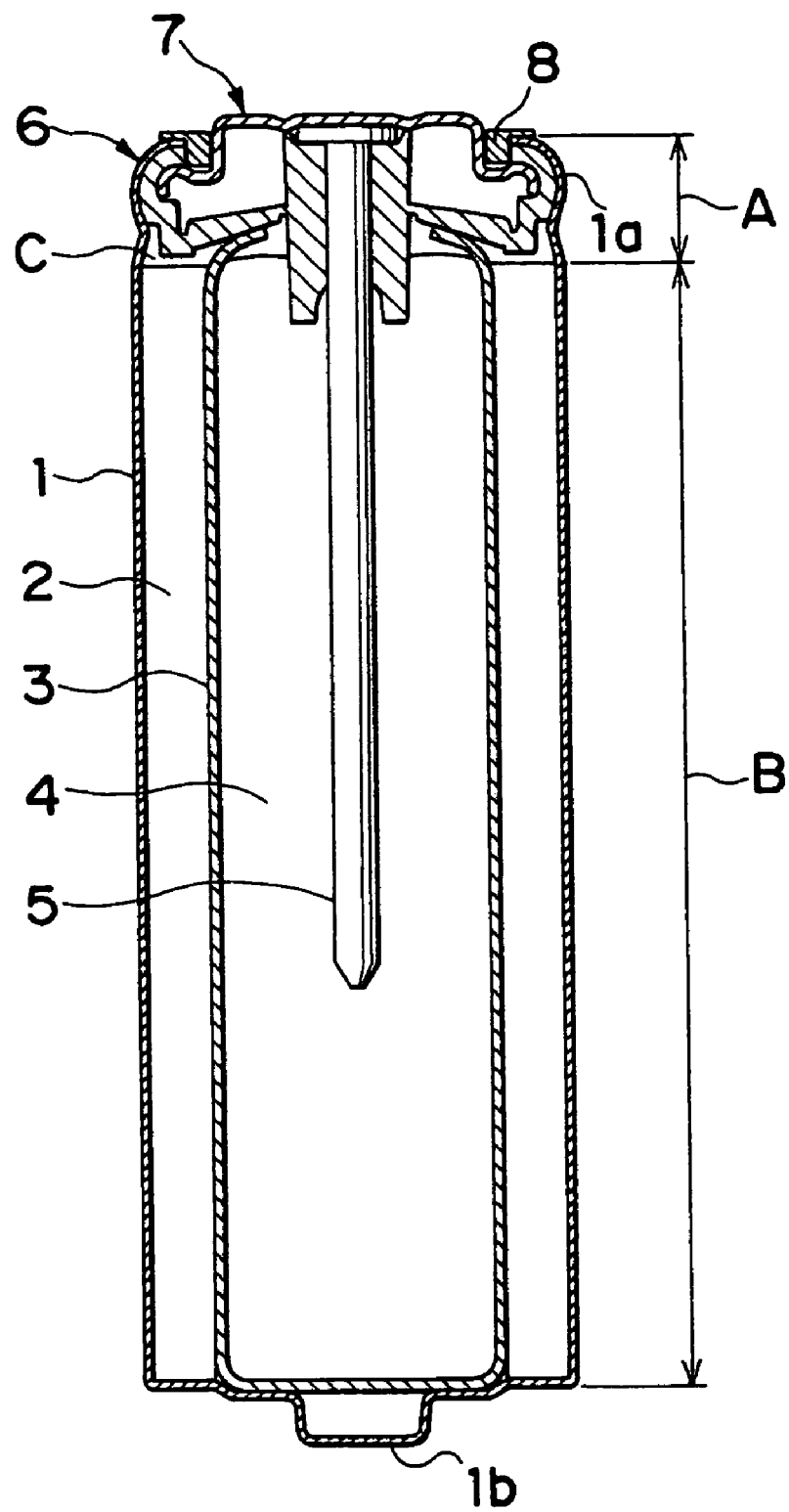
FIG. 1 is a cross-sectional view that shows an entire structure of an alkaline dry cell to which the present invention is applied.

Referring to Figures, the following description will discuss preferred Embodiments of the present invention. Here, in the Figures, those members having the same reference numerals are the same members.

FIG. 1 shows an example in which the present invention is applied to a size "AA" alkaline dry cell (hereinafter, simply referred to as an alkaline dry cell or a battery).

This alkaline dry cell is provided with an external can 1 that also serves as a cathode terminal, and has a cylindrical shape with a bottom, a cylindrical shaped cathode 2 housed in this external can 1 (inside a cell chamber), a separator 3 made of a cup-shaped non-woven cloth, placed inside the void portion of this cathode 2, a paste-state anode 4 filled inside the separator 3, a nail shaped anode collector rod (anode collector) 5 that is inserted into this anode 4, and an electrolyte solution (not shown) that mainly composed of a potassium hydroxide aqueous solution in which the separator 3 and the cathode 2 are impregnated, and the opening edge 1a of the external can 1 is sealed. A cathode terminal portion 1b, which has a protruding shape, is formed on the bottom of the external can 1. Here, reference numeral A in FIG. 1 shows a sealing edge portion of the external can 1, and reference numeral B shows a trunk portion of the external can 1. More specifically, in the state shown in FIG. 1, the sealing edge portion A of the external can 1 indicates an upper portion from the portion in which the external dimension of the external can 1 becomes smaller than the original dimension due to group deformations, and the trunk portion B indicates a lower portion from this portion.

Then, in the alkaline dry cell to which the present invention is applied, the can thickness (thickness) in the trunk portion A of the external can is set to not 5 more than 0.18 mm, and the can thickness in the sealing portion B is set to 1.4 times greater than the can thickness in the trunk portion A.

The cylindrical shaped cathode 2, housed in the external can 1, is composed of a mixture of manganese dioxide and graphite (conductive material). In the above-mentioned alkaline dry cell, upon forming the cathode 2 by mixing these manganese dioxide and graphite (conductive material), an alkaline electrolyte solution having a higher potassium hydroxide concentration is used. This is because by forming the cathode 2 using the alkaline electrolyte solution having a higher potassium hydroxide concentration, it is possible to increase the strength of a molded body forming the cathode 2. As a result, it is not necessary to use a binder (binder resin) for joining the manganese dioxide and graphite (conductive material) so that the filling rate for the materials related to the discharging characteristic can be increased correspondingly, thereby making it possible to improve the discharging characteristic of the battery. Moreover, since the strength of the cathode 2 housed in the external can 1 is increased, it is possible to make the external can 1 less susceptible to a deformation due to an external force even when the above-mentioned thin steel plate is used as the external can 1.

Inside the opening edge 1a of the external can 1, that is, in the sealing edge portion A, are installed a sealing member 6 that is made of a resin (in Examples of Figures, 6,6 nylon) such as polyamide and polypropylene, and has an anti-explosion safety valve mechanism, a sheet of metal plate 7 (anode terminal plate 7) that is a supporting member for supporting the sealing member with the inner circumferential side, and also serves as an anode terminal plate, and an insulating plate 8 made of a resin member having a short-cylindrical shape with a flange for electrically insulating between the opening edge 1a of the external can 1 and the anode terminal plate 7.

Figure 2:
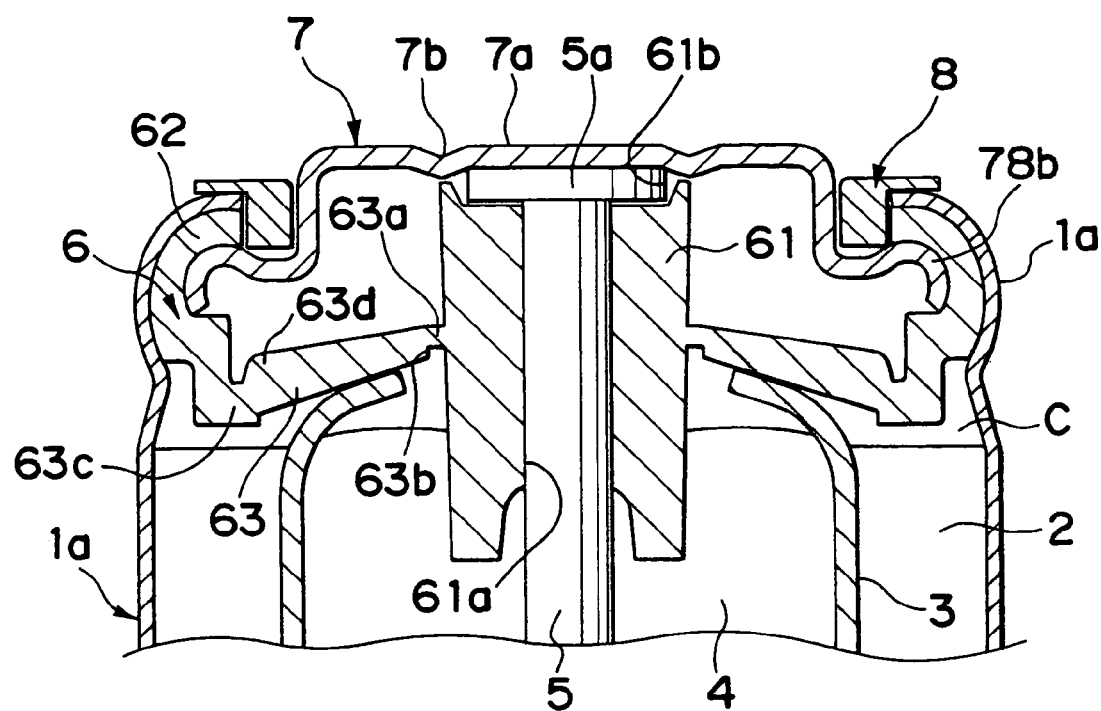
FIG. 2 is a partially enlarged view that shows a sealing edge portion of the unit-three type alkaline dry cell shown in FIG. 1.

As illustrated in FIG. 2 in an enlarged manner, the sealing member 6 is provided with a boss section 61 having a hole 61a through which an anode collector rod 5 is inserted, an outer circumferential portion 62 that contacts the inner circumferential face of the external can 1, a boss section 61 and a connecting portion 63 that connects the boss section 61 and the outer circumferential section 62 and also blocks the face reaching the latter from the former. Further, this sealing member 6 closes the cell chamber C storing a battery active substance, thereby preventing the electrolyte solution inside the cell chamber C from leaking outside, as well as electrically insulating the anode terminal plate 7 and the external can 1, together with the insulating plate 8.

A thin portion 63a constituting an anti-explosion safety valve mechanism is installed on the foot portion on the boss section 61 side in the connecting section 63 of the sealing member 6. This thin portion 63a has a function for allowing the connecting portion 63 to be deformed upward in the Figure when the inner pressure of the battery increases to not less than a predetermined level, and for releasing one portion of the inner pressure outside the cell chamber C through a gas releasing hole of the anode terminal plate 7, which will be described later, by allowing the thin portion 63a to rupture when the inner pressure further increases.

However, in the conventional sealing member, since the difference in thickness between the anti-explosion thin portion and the portion right outside this portion is not so great, and since the thickness of the connecting portion is comparatively thin and uniform, there might be cases in which at short-circuiting high-temperature times, the connecting portion which has swelled into a dome shape comes to contact the anode terminal plate to block the gas releasing hole prior to the rupture of the thin portion, or in which at the time of an excessive discharging time, the connecting portion which has swelled into a dome shape comes to rupture prior to the rupture of the thin portion. Therefore, in order to prevent these problems, in the sealing member 6 provided in the alkaline dry cell of the present invention, the anti-explosion thin portion 63a formed in the connecting portion 63 is designed in such a manner that its thickness becomes thinner discontinuously as compared with a portion (a first thickness portion) 63b positioned right outer circumferential side thereof, with a step difference placed between it and the first thickness portion 63b.

A comparatively thin stress absorbing portion 63c is placed on the foot portion on the outer circumferential portion 62 side on the connecting portion 63 of the sealing member 6. This stress absorbing portion 63c is formed in such a manner that its thickness becomes thinner discontinuously as compared with a portion (second thickness portion) 63d positioned right inner circumferential side thereof, with a step difference placed between it and the second thickness portion 63d. With this arrangement, one portion of a stress that is exerted on the connecting portion 63 when the sealing member 6 is tightened so as to seal the opening edge 1*a* of the external can 1 is absorbed so that it is possible to prevent the stress from concentrating on the anti-explosion thin portion 63*a*.

The portion in the connecting portion 63 of the sealing member 6 that reaches the second thickness portion 63*d* from the first thickness portion 63*b* is formed so as to have a thickness that continuously becomes thicker from the first thickness portion 63*b* to the second thickness portion 63*d*. In the sealing member 6 shown in the Figure, the first thickness portion 63*b* is set to have a thickness of 0.4 to 0.5 mm, and the thickness of the second thickness portion 63*d* is set to be 2.5 to 3.0 times the thickness of the first thickness portion 63*b*. Here, the shape of this connecting portion 63, the thicker formation of the connecting portion 63 as compared with the conventional one, and the structure of the anti-explosion thin portion 63*a* having a predetermined step difference between it and the first thickness portion 63*b* in combination make it possible to more positively prevent the above-mentioned problems at the time of a short-circuiting high temperature and at an excessive discharging time.

In the boss section 61 of the sealing member 6, the upper end of a hole 61*a* in FIG. 2 through which the anode collective rod 5 is inserted is formed into a large diameter hole section 61*b* having an inner diameter greater than the inner diameter of the hole portion other than this, and in a state shown in the Figure where the anode collector rod 5 has been inserted and set, the large diameter end 5*a* of the anode collector rod 5 is fitted to the large diameter hole section 61*b* of the boss section 61, with the upper end of the corresponding large diameter end 5*a* being slightly sticking out from the upper end face of the boss section 61 or being virtually set to the same level therewith. In FIG. 2, the circumferential wall of the boss section 61 is set to have a thickness thicker than that of the outer circumferential portion 62, and this is because, while the outer circumferential portion 62 is a portion to be caulked and deformed at the time of sealing the opening, the boss section 61, which is located on the rear face side of the center portion of the anode terminal plate 7 together with the anode collector rod 5 inserted through it, has a function for supporting the anode terminal plate 7 from the rear face side so as not to allow this portion to cave inward.

Figure 3:
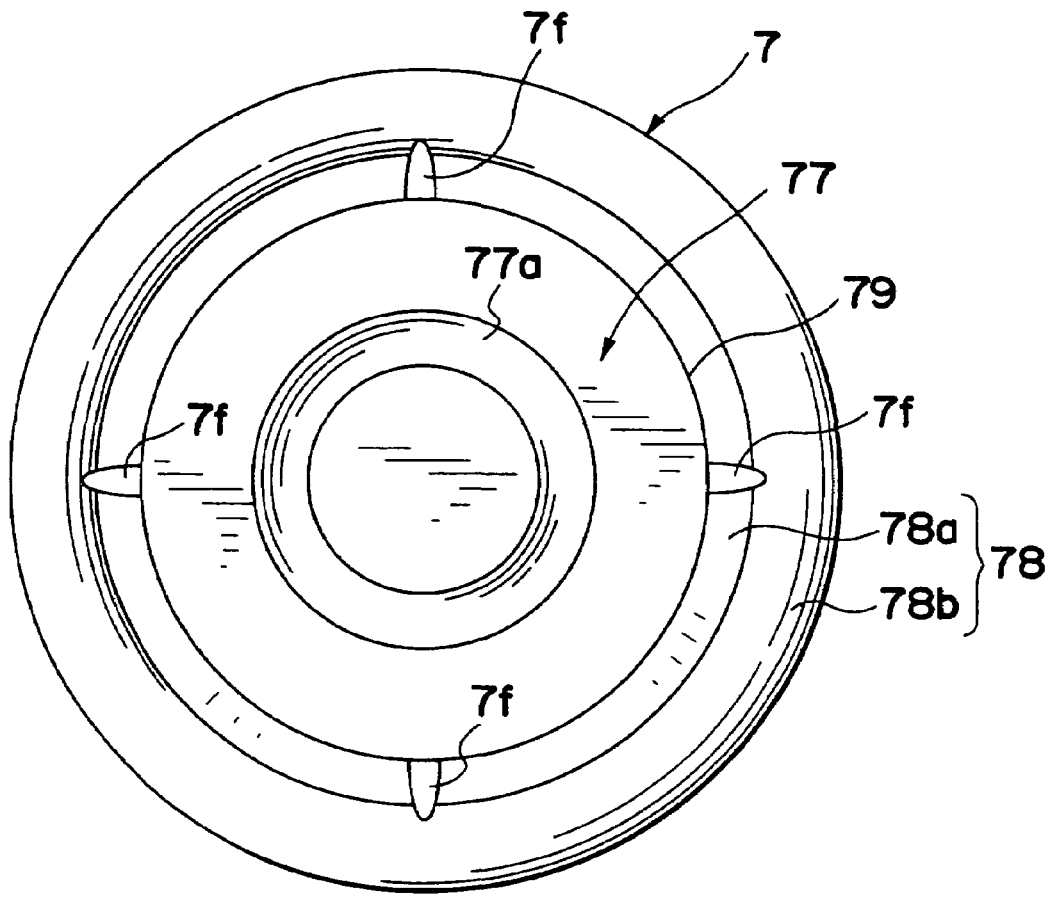
FIG. 3 is a plan view that shows one example of an anode terminal plate (metal plate) used in the present invention.
Figure 4:
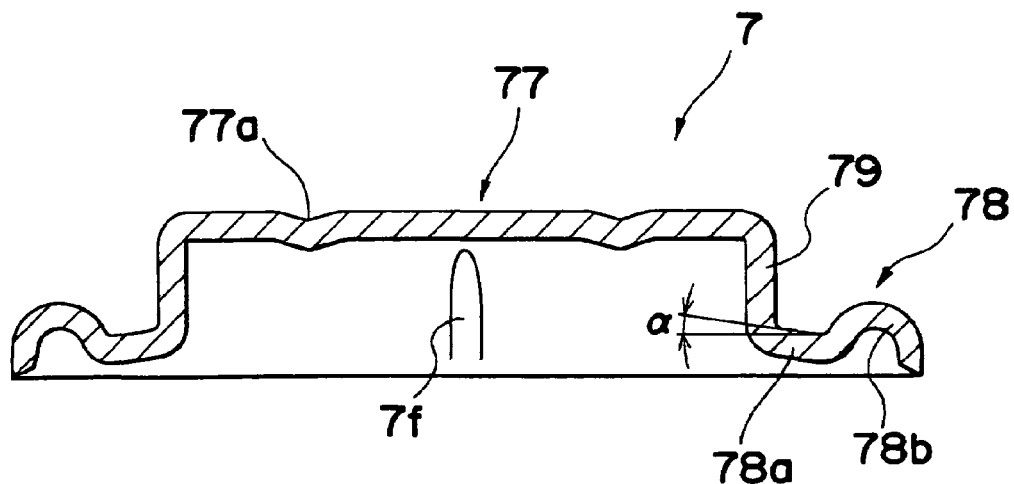
FIG. 4 is a cross-sectional view that shows a cross-sectional structure of the anode terminal plate shown in FIG. 3.

Here, as illustrated in FIG. 3 and FIG. 4 as a single unit, the anode terminal plate 7, which is made of a sheet of steel plate, is provided with a terminal face 77 formed on the center portion with a protruding shape, a flange face 78 formed on the outer circumferential portion in a manner so as to surround the terminal face 77 when viewed from the direction vertically penetrating the terminal face 77, and a terminal face side face 79 that has a cylindrical shape, and reaches from the outer circumference of the terminal face 77 toward the inner circumference of the flange face 78. Among these members, a recess 77*a*, which slightly caves in in a manner so as to surround the center portion, and has a round shape on a plan view, is formed in the terminal face 77, and the large diameter end 5*a* of the anode collective rod 5 is joined to the rear face side of the center portion that is surrounded by this recess 77*a* through a spot welding process, etc. (see FIG. 2).

The flange face 78 in the anode terminal plate 7 is constituted by a flat portion 78*a* located on the inner circumferential side and a curved portion 78*b* on the outer circumferential side that is placed over the entire circumferential portion of the anode terminal plate 7 so as to firmly support the outer circumferential portion 62 with the inner circumferential side when the sealing member 6 is caulked. The flat portion 78*a* on the inner circumferential side has a relatively flat shape as compared with the curved portion 78*b* on the outer circumferential side, in a cross-section in the thickness direction shown in FIG. 4. Then, this flat portion 78*a* is designed to have a slant not less than 4 degrees in the lowering direction toward the outside with respect to the terminal face 77*a* so that it is possible to reduce deviations in dimension in the height direction due to deformation of the anode terminal plate 7 in the sealing edge process. Here, in the illustrated examples, the angle a, made by the flange face flat portion 78*a* and the terminal face 77, that is, the angle a made by a plane formed by connecting the inflection point located at the outer circumferential edge (on the curved portion 78*b* side) and the inflection point located at the inner circumferential edge (on the terminal face side face 79 side) and the terminal face 77, is set to 8 degrees.

As described in the aforementioned section of "Means for solving the problems", the curved portion 78*b* placed on the outer circumferential side of the anode terminal plate 7 is formed in a curved manner in virtually a C-letter shape or an arc shape with an average curvature radius of not less than 1 mm and in an angle range not less than 90 degrees in a cross section obtained when the anode terminal plate 7 is cut in the thickness direction through the center thereof, and its outer circumferential side is allowed to come into contact with the inner circumferential side of the outer circumferential portion 62 of the sealing edge device 6 over an angle range greater than 90 degrees for the reason that has already been explained. Then, at this contact portion, the outer circumferential portion 62 of the sealing edge device 6 is caulked and tightened by the curved portion 78*b* of the anode terminal plate 7 placed on the inner circumferential side of this and the opening edge 1*a* of the external can 1 placed on the outer circumferential side so that, as illustrated in FIG. 2, the sealing member 6 is attached to a predetermined position inside the opening edge 1*a* of the external can 1; thus, in this state, the upper portion of the inside of the cell chamber C is sealed with a predetermined space for securing the operation of the safety valve (thin portion 63*a*) between the connecting portion 63 of the sealing member 6 and the anode terminal plate 7. Here, reference numeral 7*f* in FIG. 3 and FIG. 4 indicates a gas releasing hole for externally releasing gas generated inside the cell chamber during the actuation of the safety valve.

Figure 5:
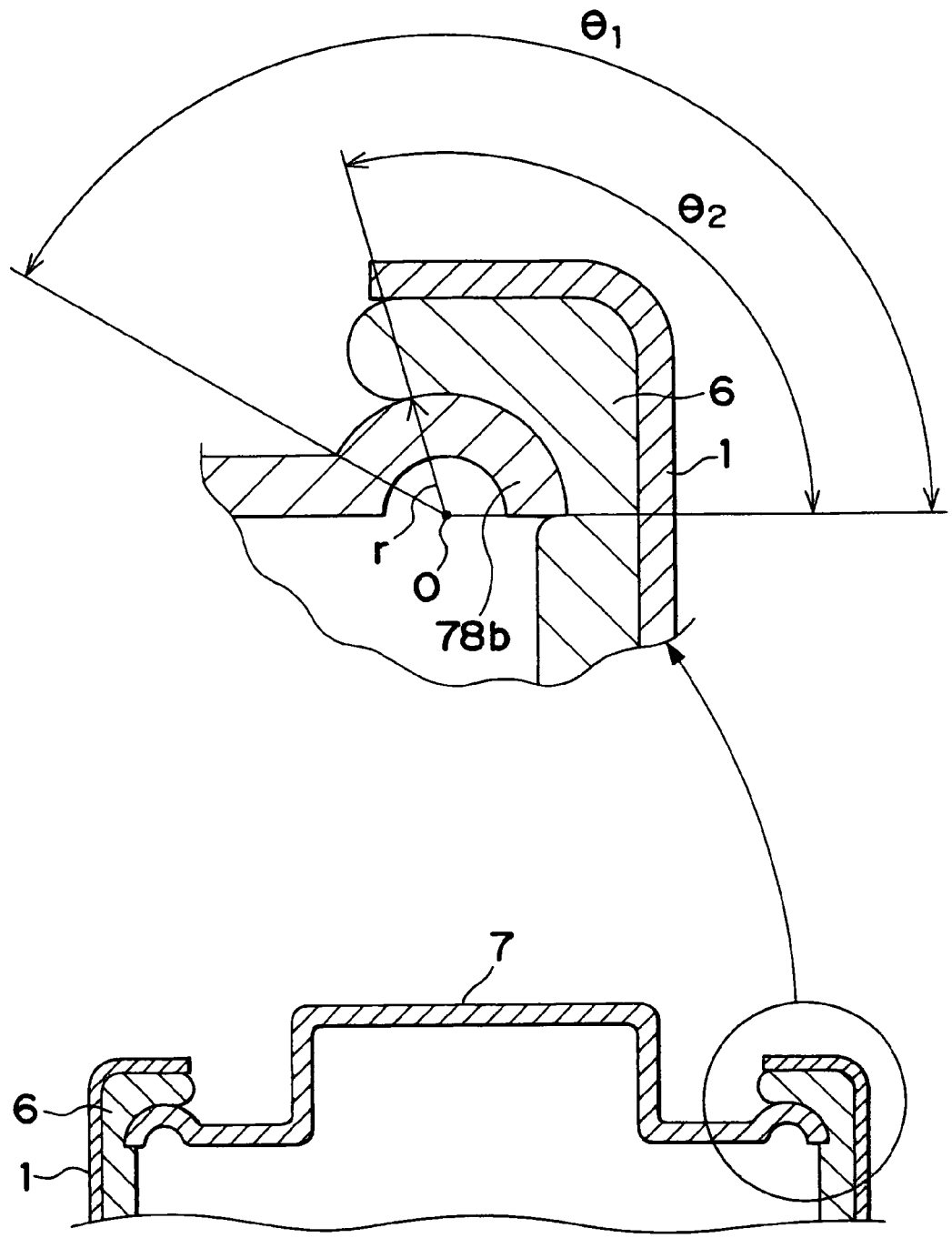
FIG. 5, which shows another example of the anode terminal plate, is a cross-sectional view that schematically shows the structure of its peripheral portion in a partially omitted manner.

Here, as illustrated in FIG. 5 that shows another example of the anode terminal plate 7, when the curved portion 78*b* is approximated by a hypothetical circle having the above-mentioned average curvature radius r as its radius, the angle range in which the curved portion 78*b* is installed is referred to as an angle θ1 made by both of the ends of the curved portion 78*b* with respect to the center O of the circle as the reference. In the same manner, when the curved portion 78*b* is approximated by a hypothetical circle having the above-mentioned average curvature radius r as its radius, the angle range in which the curved portion 78*b* and the sealing edge device 6 are in contact with each other is referred to as an angle θ2 made by both of the ends of the corresponding contact portion of the curved portion 78*b* with respect to the center 0 of the circle as the reference.

Here, after the sealing member 6 has been attached, the insulating plate 8 made of a short-cylinder shaped resin member with a flange is attached to a predetermined position as illustrated, by fitting and inserting the short-cylinder portion 8*a* of the insulating plate 8 into a gap formed among the terminal face 77 of the anode terminal plate 7, the opening edge of the external can 1 and one end of the outer circumferential portion 62 of the sealing member 6; thus, the anode terminal plate 7 and the external can 1 are electrically insulated from each other.

Figure 6:
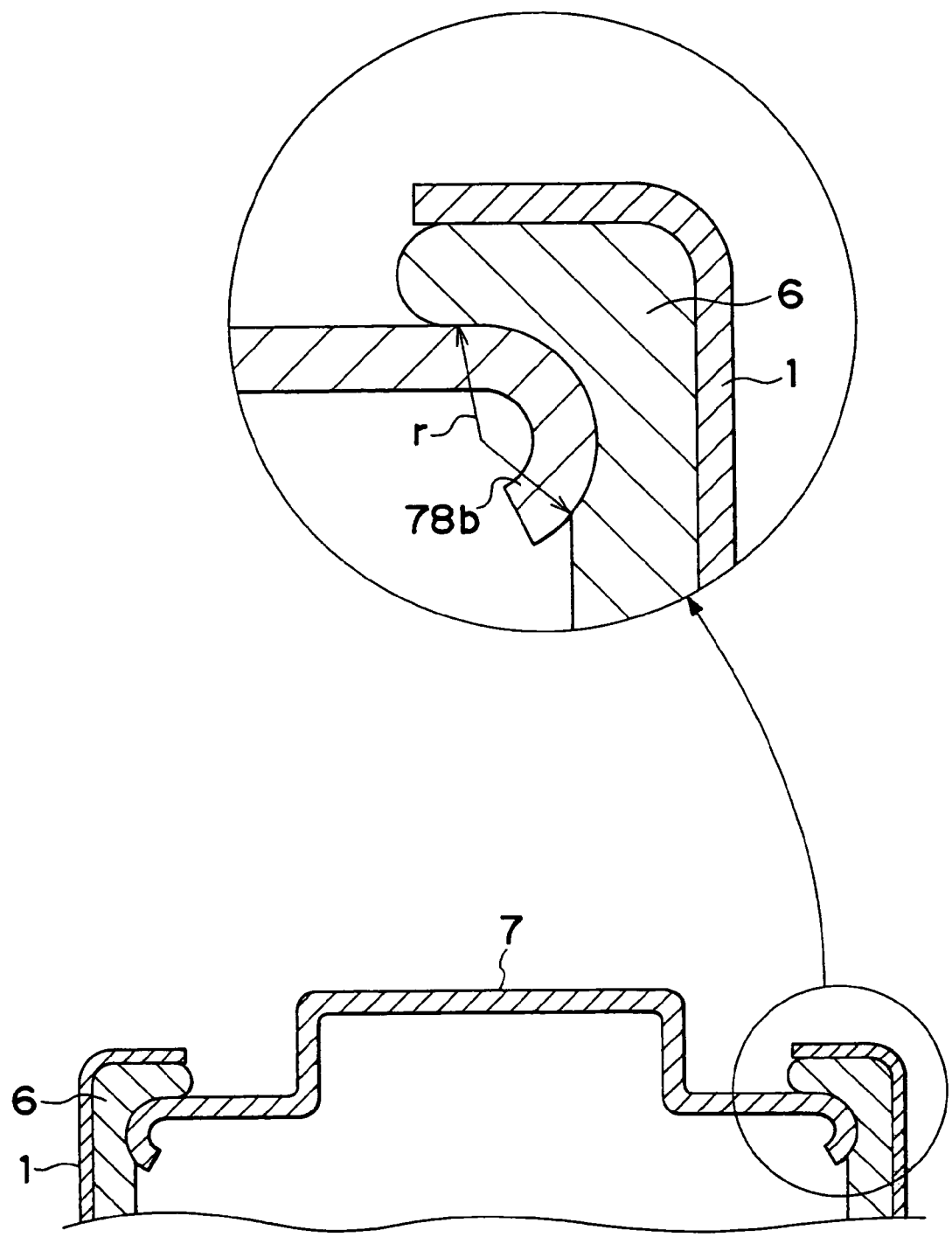
FIG. 6, which shows still another example of the anode terminal plate, is a cross-sectional view that schematically shows the structure of its peripheral portion in a partially omitted manner.
Figure 7:
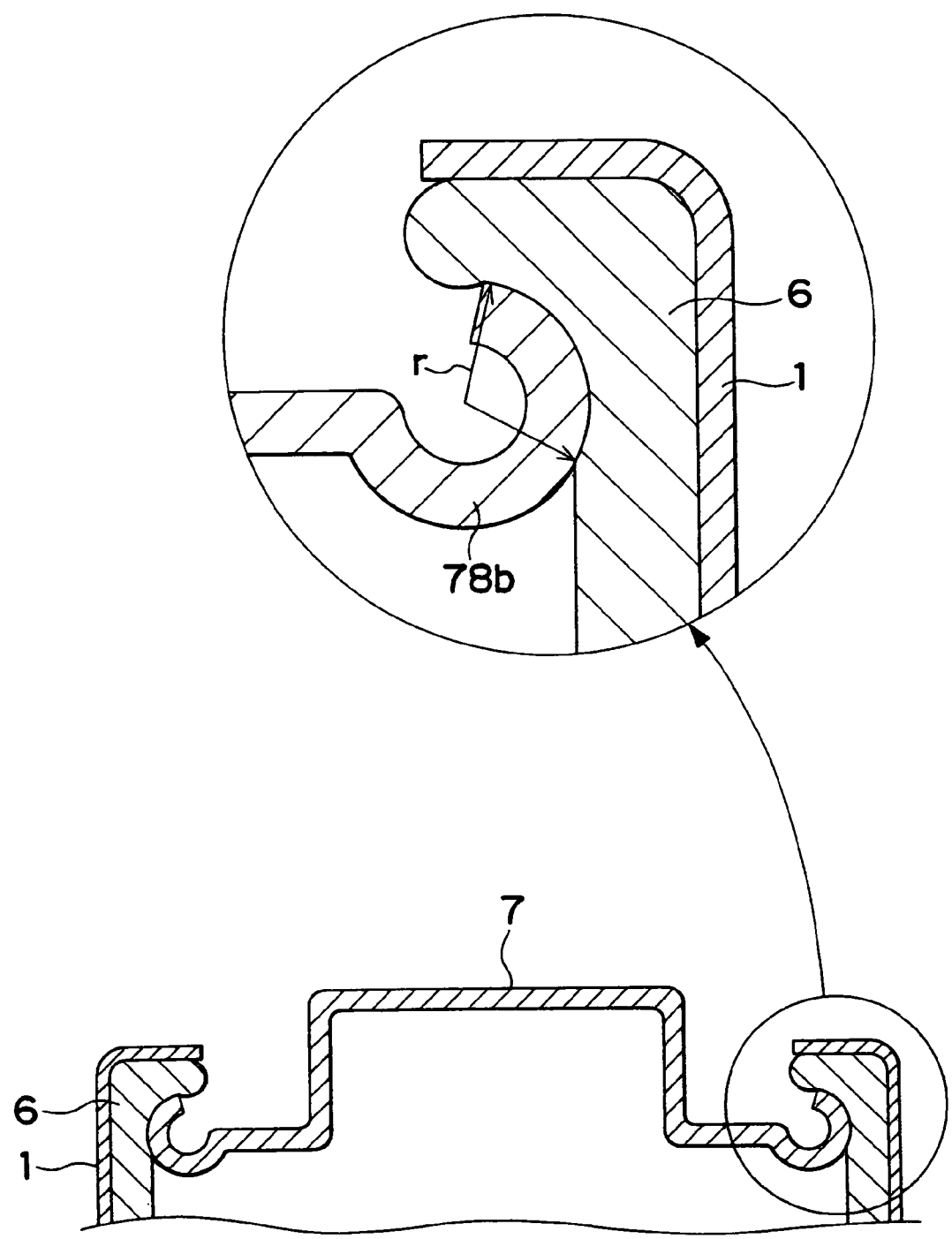
FIG. 7, which shows still another example of the anode terminal plate, is a cross-sectional view that schematically shows the structure of its peripheral portion in a partially omitted manner.

Here, the curved portion 78*b* to be installed on the outer circumferential side of the anode terminal plate (metal plate) 7 may be freely bent in any bending direction, as long as the aforementioned conditions of the average 5 curvature radius r and the angle ranges θ1 and Θ2 are satisfied. FIGS. 5 to 7 show other examples of the curved portion 78*b*. Among these, FIG. 5 shows an example in which the curved portion 78*b* is formed so that it has a protrusion in the same direction or in the same side as the terminal face 7*a* of the anode terminal plate 7. FIG. 6 shows an example in which the curved portion 78*b* is formed so as to have a protrusion outward in the radial direction of the anode terminal plate 7. In FIG. 7, the outer circumferential portion of the anode terminal plate 7 is once bent in a direction opposite to the protruding direction of the terminal face 77, and this is then further curved reversely so that the curved portion 78*b* is formed with the outer circumferential side thereof being in contact with the outer circumferential portion 62 of the sealing member 6 in a predetermined state. Moreover, the anode terminal plate 7 may be provided with recesses and protrusions as concentric circles in the same manner as the recess 77*a* formed in the center so as to make it hardly cave in even when, for example, the battery is dropped or when the terminal face 77 is strongly pressed from outside, or so as to make the entire portion of the anode terminal plate 7 less susceptible to deformation at the time of the caulking process of the sealing member 6.

In a cylindrical alkaline dry cell, with respect to the supporting member for supporting the resin sealing member with the inner circumferential side, the metal washer, which has been conventionally used, is omitted, and instead of this, an anode terminal plate (metal plate) 7 as shown in FIGS. 1 through 5 are used so that the outer circumferential portion of the sealing member 6 is interpolated between the anode terminal plate 7 and the external can 1, and caulked therein; thus, it is possible to reduce the thickness of the sealing edge portion from the following two reasons.

First, by eliminating the metal washer, the sealing edge portion is made thinner by at least the corresponding thickness of the metal washer. For example, in the case of a size "AA" alkaline dry cell using the method for pressing the sealing member with a metal washer, manufactured in Japan, metal washers having a thickness of not less than 0.6 mm, approximately, 0.75 mm, are used, and by eliminating this washer, it is possible to reduce the sealing edge portion by at least the corresponding thickness of this.

Second, it is not necessary to specifically install a space for allowing the connecting portion 63 of the sealing edge portion 6 to deform through the inner pressure. The following description will further discuss this fact.

Figure 16:
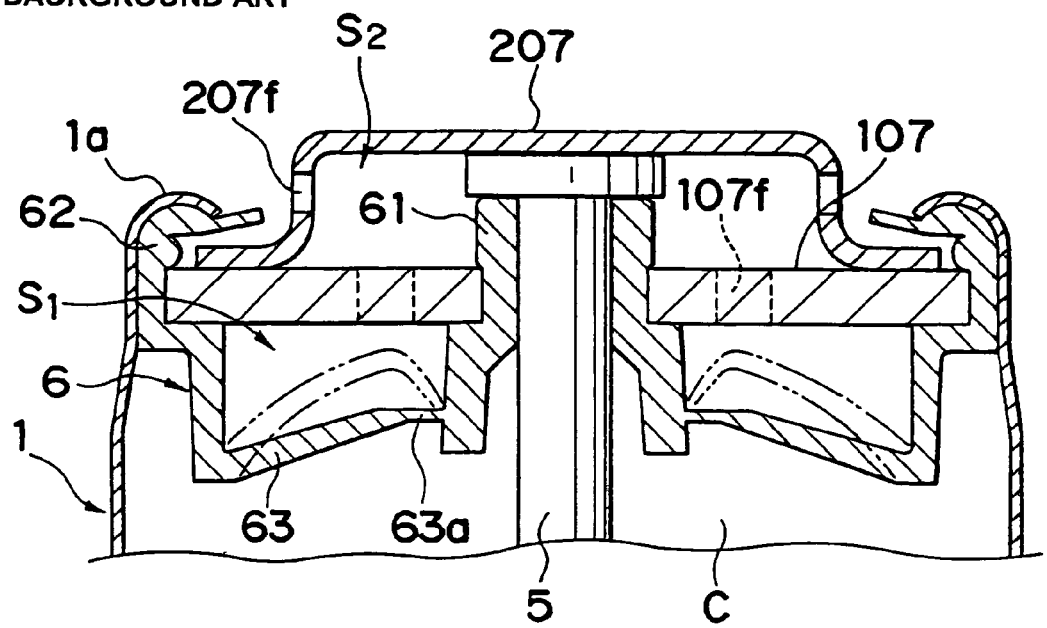
FIG. 16 is a partial enlarged view that shows the sealing edge portion of the alkaline dry cell of FIG. 15, in an enlarged manner.
Figure 17:
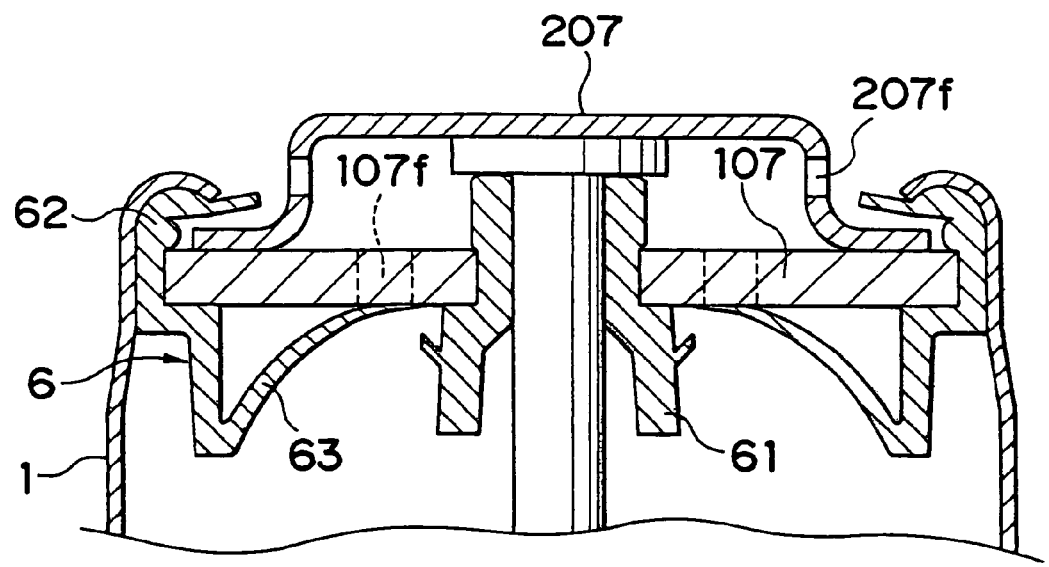
FIG. 17 is a schematic drawing that shows a state in which, in the conventional alkaline dry cell (unit-three type), the connecting portion of the sealing edge portion has blocked a gas releasing hole of a metal plate (metal washer).
Figure 18:
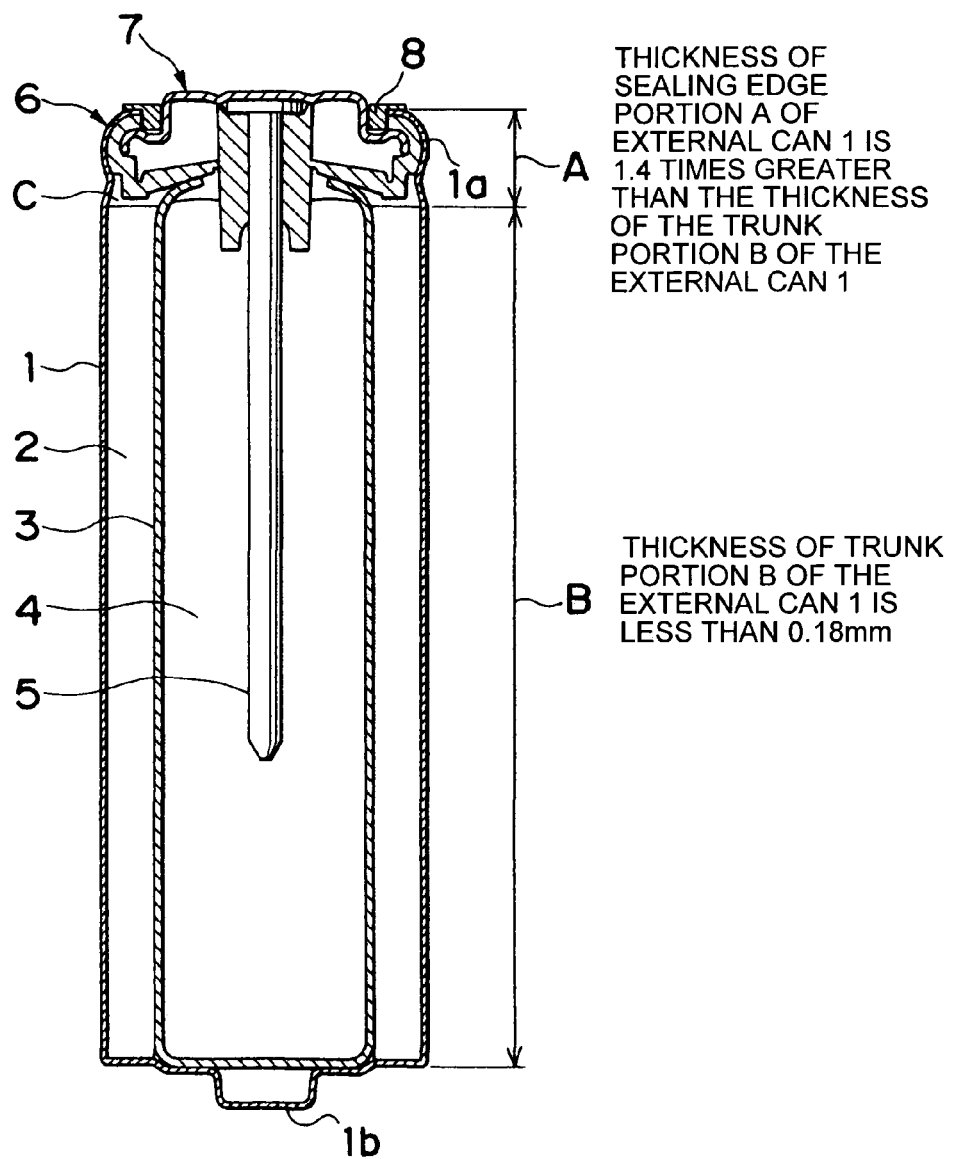
FIG. 18 is a cross-sectional view that shows an entire structure of an embodiment of the alkaline dry cell of the present invention.

Normally, the sealing member 6 is made of nylon, polypropylene, etc., and an anti-explosion thin portion is formed in one portion thereof as described earlier. When the inner pressure of the battery becomes higher for any reason, the sealing member 6, for example, as shown in FIG. 16, is deformed as indicated by a chain line in the same Figure, and when the inner pressure further increases, the thin portion 63*a* of the connecting portion 63 is allowed to rupture to release one portion of the inner pressure, so that the further increase of the inner pressure is prevented. In the conventional alkaline dry cell shown in FIGS. 16 and 17, a gap (space S1) is formed between the thin portion 63*a* of the sealing member 6 and the metal washer 107; however, if this gap is too small, when the inner pressure increases, the connecting portion 63 or the thin portion 63*a* of a deformed sealing member 6 is pressed by the metal washer 107, and is not deformed; consequently, no matter how high the inner pressure becomes, the thin portion 63*a* is not allowed to rupture, with the result that it is not possible to release the inner pressure. For this reason, a certain degree of gap needs to be placed between the thin portion (actuation point of the safety valve) 63*a* of the sealing member 6 and the metal washer 107 for supporting the sealing member 6; therefore, for example, in the case of the size "AA" alkaline dry cell manufactured in Japan, normally, a gap having an approximate length of 1.0 to 1.5 mm is provided.

Figure 15:
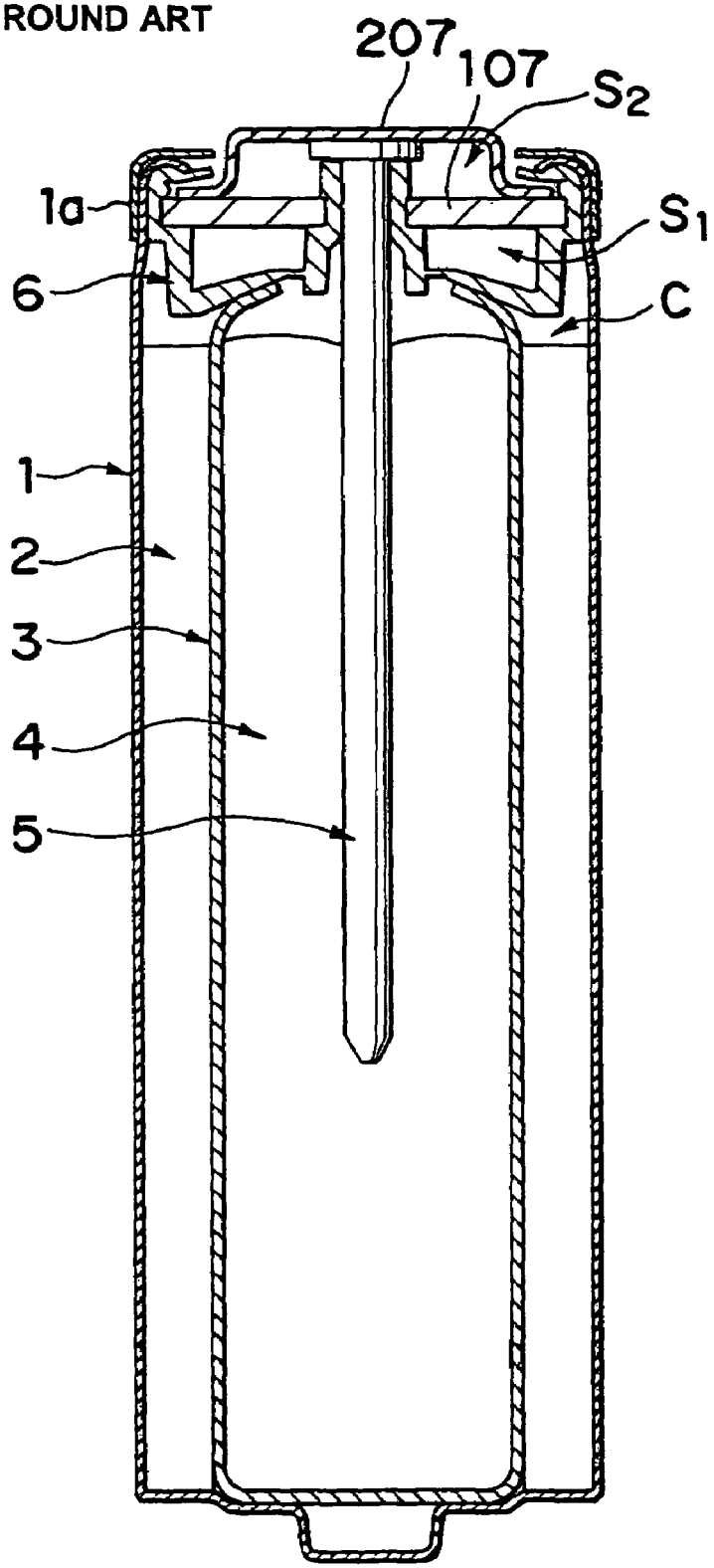
FIG. 15 is a cross-sectional view that shows a general structure of a conventional alkaline dry cell (size "AA" alkaline dry cell).

Here, as illustrated in FIGS. 15 and 16, it has been actually standardized that the anode terminal plate 207 of an alkaline dry cell is formed into a protruding shape; however, in the case when a metal washer is used as a supporting member used for caulking the sealing member 6, there is a wasteful space S2 that is not needed by the battery between the metal washer 107 and the anode terminal plate 207, as described earlier. However, when the metal washer is eliminated as in the case of the present invention while using the anode terminal plate (metal plate) 7 as illustrated in FIGS. 1 through 7 as a supporting member, the above-mentioned space S2, which conventionally has been a wasteful space, is utilized as a space required for the sealing member 6 to be deformed therein. Therefore, it becomes possible to reduce the thickness of the sealing edge portion as a whole.

For the reasons as described above, as illustrated in FIGS. 1 through 7, the metal plate serving as the supporting member for supporting the sealing member 6 from the inside thereof is constituted by only the anode terminal plate 7, and the thickness of the anode terminal plate is made thinner than that of the conventional metal washer (for example, 0.3 to 0.7 mm) so that the volume of the sealing edge portion can be reduced, and the inner volume of the battery (the volume of the cell chamber C) is consequently allowed to increase. Referring to examples shown in FIGS. 1 and 2, the structure of FIG. 1 has a sealing edge portion A that has a thickness not less than 10% with respect to the height of the battery (thickness in the battery height direction), while the structure of FIG. 1 has a reduced thickness of the sealing edge portion of 8% with respect to the height of the battery, resulting in an increase of 4% in the battery inner volume. When this increased volume is filled with the battery active substance, the capacity of the battery increases by 4%, and if this is allowed to remain as a void, the void functions as an absorber to alleviate an increased pressure when gas is generated inside the battery so that it is effectively utilized for the safety purpose.

Moreover, in this alkaline dry cell, a slant of not less than 4 degrees is provided in the terminal face 77 in the anode terminal plate 7 and in the flange face flat portion 78 so that the anode terminal plate 7 after the sealing edge process is always deformed to have a height higher than the original height. Thus, it is possible to solve the problem of deviations in dimension due to a deformed anode terminal plate 7 in the sealing edge process.

However, only using a metal plate also serving as the anode terminal plate instead of a metal washer that has been omitted might cause a leakage of the inside strong alkaline electrolyte solution through a gap between the external can and the sealing member in the event of an abrupt temperature change, etc. in the battery. Since the metal plate, which serves as the supporting member for pressing the sealing member with the inner side, becomes thinner, the anode terminal plate is deformed at the time of the caulking process, resulting in an insufficient force for pressing the sealing member.

It is possible to avoid the deformation of this type by providing an anode terminal plate 7 as in the case of the present invention and placing the curved portion 78b having a cross-sectional shape having virtually a C-letter shape or an arc shape with an average curvature radius of not more than 1 mm on the outer circumferential portion thereof, with the curved portion 78b being allowed to contact the sealing member 6 within a predetermined angle range. The process curing resulting from the formation of this curved portion 78b makes the anode terminal plate 7 less susceptible to deformation, and even if the pressing force applied onto the sealing member 6 through the external can 1 is exerted on the outer circumferential portion of the anode terminal plate 7, the sealing member 6 is firmly backed up by the entire portion of the anode terminal plate through the curved portion 78b contacting the sealing member 6 with a comparatively wide angle range. Therefore, the circumferential edge portion of the opening edge 1a of the external can 1 is bent inward and the sealing member 6 is tightened between this and the anode terminal plate 7 with a strong force; consequently, it is possible to improve the adhering property between the external can 1 and the sealing member 6, that is, the leak resistant property (liquid sealing property) between them. Moreover, since the curved portion 78b of the anode terminal plate 7 is allowed to contact the sealing member 6 within an angle range greater than 90 degrees with the sealing member 6 being caulked so that the contact area between the sealing member 6 and the external can 1 is made comparatively great; thus, this also makes it possible to apply a sufficient leak resistant property to the border portion between the sealing member 6 and the external can 1.

In addition to the above-mentioned arrangements, the alkaline dry cell of the present invention has a modified shape or structure of the resin sealing member 6 as described below, so that a safety valve, constituted by an anti-explosion thin portion 63a placed on the connecting portion 63 of the sealing member 6, is positively operated normally so that it is possible to improve the reliability and the safety.

First, a stress absorbing portion 63c is placed on the foot portion on the outer circumferential 62 side in the connecting section 63 of the sealing member 6, and this stress absorbing portion 63c is used for absorbing one portion of the stress exerted on the connecting portion 63 at the time of the lateral tightening sealing edge process; therefore, it is possible to prevent a stress concentration onto the anti-explosion thin portion 63a at the time of the lateral tightening sealing edge process. This makes it possible to suppress variations in the operational pressure of the safety valve, and consequently to improve the reliability of the safety valve correspondingly.

Next, an anti-explosion thin portion 63a is installed on the foot portion on the boss section 61 side in the connecting portion 63 of the resin sealing member 6 in such a manner that its thickness becomes thinner discontinuously as compared with a portion (first thickness portion) 63b located right outside to surround this, with a step difference provided between this and the first thickness portion 63a so that the thin portion 63a is positively ruptured at the time of a short-circuiting high temperature and an excessive discharging time. In other words, in the case when softening of the resin sealing member due to a heat generation at the time of short-circuiting and deformation in the connecting portion 63 due to an increase in the battery inner pressure occur, the stress is concentrated on the anti-explosion thin portion 63a so that the thin portion 63a is cut off and ruptured prior to the contact of the connecting portion 63 having a dome shaped deformation to the anode terminal plate 7, thereby making it possible to release the inner pressure. Moreover, at an excessive discharging time, a stress is exerted on the connecting portion 63 due to an increase in the inner pressure although no softening of the sealing edge resin occurs due to a heat generation at the time of an excessive discharging; therefore, in this case also, the thin portion 63a is cut off and ruptured prior to the rupturing of the connecting portion 63 so that the inner pressure is released. Thus, at the time of a short-circuiting high temperature or an excessive discharging time, the safety valve is operated normally so that the inner pressure is released without rupturing the connecting portion 63 of the sealing member 6; therefore, it is possible to prevent scattering of the contents or the generation of a rupturing noise caused by the rupturing of the connecting portion 63.

In particular, the portion of the connecting portion 63 in the sealing member 6, which reaches from the first thickness portion 63b to the second thickness portion 63d, is formed in such a manner that the thickness becomes continuously thicker from the former to the latter, and the first thickness portion 63b is set to have a thickness of 0.4 to 0.5 mm, and the second thickness portion 63d is set to have a thickness of 2.5 to 3.0 times greater than the first thickness portion 63b; thus, such thickness shapes of the connecting portion 63 and the structure of the anti-explosion thickness portion 63a having a predetermined step difference between it and the first thickness portion 63b, in combination, make it possible to prevent the rupturing of the sealing member 6 even at a short-circuiting high temperature time and an excessive discharging time.

The following description will discuss Examples of the present invention; however, the present invention is not intended to be limited by these Examples.

Here, in the following description, "%", always indicates "weight percent (wt %)" unless otherwise defined.

EXAMPLES 1 TO 4

A killed steel plate having a plate thickness of 0.25 mm was formed into an external can used for a size "AA" alkaline dry cell through a deep drawing process. At this time, the can thickness of the sealing edge portion was set to the original thickness of the steel plate, while the can thickness of the trunk portion was processed so as to be thinner than the original steal plate. Table 1 shows the thickness of the can in the trunk portion and the sealing edge portion of each of external cans used in Examples 1 to 4 in the present invention, as well as those of each of external cans used in Comparative Examples 1 and 2, which will be described later.

Moreover, in Examples 1 to 4, in order to prevent a dent in the cathode terminal which will be caused when the battery is allowed to drop, the cathode terminal portion 1b of the external can (see FIG. 1) is also processed so as to have a can thickness thicker than the trunk portion.

Next, a cathode material (11.0 g), prepared by mixing manganese dioxide, graphite and water at a ratio of 92:5:3 (weight ratio) through an electrolytic method, was processed and molded into a cathode having a cylindrical shape measuring 9.1 mm in inner diameter, 13.3 mm in outer diameter and 43.0 mm in height, and this was inserted into an external can for a size "AA" alkaline dry cell. Thereafter, a groove was formed at a position 3.7 mm apart from the opening edge of the external can in the height direction. This arrangement is made so that when the sealing member is inserted later, the sealing member is held at the position of the groove so as not to be shoved deeper than the groove position. Moreover, inside the external can, pitch is applied from the opening edge to the position 3.7 mm in depth in the height direction so as to improve the adhering property between the external can and the sealing member. Here, with respect to the amount of application of the pitch, it has been found that although the amount of application of the pitch of not more than 20 mg causes degradation in the leak liquid resisting property, the amount not less than this causes no difference in the leak liquid resisting property.

Next, non-woven cloths, each made of vinylon and rayon having a thickness of 100 μm, were stacked three deep, and rolled into a cup shape to form a separator, and this was inserted inside the preliminarily prepared cylindrical cathode, and these were permeated with 1.5 g of potassium hydroxide at a concentration of 39% serving as an electrolyte solution. Next, 4.0 g of zinc powder with a purity of 99.0% that was filtered through a sieve of 425 μm in mesh, but was not filtered through a sieve of 75 μm in mesh, 2.0 g of potassium hydroxide at a concentration of 39% and 0.04 g of polyacrylic acid soda were kneaded to form a paste-shaped anode, and this was inserted inside the separator.

Next, a tin-plated anode collector rod made of brass, used for a collector on the anode, was inserted into a boss section of a sealing member, and the anode collector rod and the anode terminal plate were joined to each other through a spot welding process. This anode terminal plate was attached to the sealing member made of nylon 6-6 (6,6 nylon), and after these had been attached to an external can provided with the above-mentioned cathode and anode, and the opening edge of the external can is caulked from the outside through a spinning system to form a size "AA" alkaline dry cell. 5.

COMPARATIVE EXAMPLE 1 AND COMPARATIVE EXAMPLE 2

A size "AA" alkaline dry cell is formed in the same manner as Examples 1 to 4 except that the can thickness of each of the sealing edge portion and the trunk portion of the external can is set as indicated by Table 1.

[Leak Liquid Resisting Test]

Among the batteries related to the respective Examples and Comparative Examples formed as described above, every 100 batteries were put in a thermostat that repeated temperature changes of −10° C. and 60° C. every 30 minutes, for three days, and after the storage, a check was made as to whether or not there was any leak of the inside strong alkaline solution (electrolyte solution) between the external can and the sealing member by using a cresol red solution as an alkali identification solution. Table 1 shows the results of the tests.

TABLE 1

|  | Can thickness of trunk portion (mm) | Can thickness of sealing edge portion (mm) | Thickness of sealing edge portion/thickness of trunk portion | Liquid leak due to temperature change |
| --- | --- | --- | --- | --- |
| Example 1 | 0.18 | 0.25 | 1.40 | None |
| Example 2 | 0.16 | 0.25 | 1.56 | None |
| Example 3 | 0.16 | 0.225 | 1.41 | None |
| Example 4 | 0.15 | 0.21 | 1.40 | None |

TABLE 1-continued

|  | Can thickness of trunk portion (mm) | Can thickness of sealing edge portion (mm) | Thickness of sealing edge portion/thickness of trunk portion | Liquid leak due to temperature change |
| --- | --- | --- | --- | --- |
| Comparative Example 1 | 0.18 | 0.225 | 1.25 | generated in 15 batteries among 100 batteries |
| Comparative Example 2 | 0.16 | 0.21 | 1.31 | generated in 17 batteries among 170 batteries |

As clearly shown by this Table, even after stored under abrupt temperature changes for a predetermined time, none of them had any liquid leak. In contrast, in the case of the alkaline dry cell obtained in Comparative Example 1, liquid leak was observed in 15 batteries among 100 samples, and in the case of the alkaline dry cell obtained in Comparative Example 2, liquid leak was observed in 17 batteries among 100 samples.

EXAMPLE 5

Next, a cathode material (11.0 g), prepared by mixing manganese dioxide, graphite and water at a ratio of 92:5:3 (weight ratio) through an electrolytic method, was processed and molded into a cathode having a cylindrical shape measuring 9.1 mm in inner diameter, 13.3 mm in outer diameter and 43.0 mm in height, and this was inserted into an external can for a size "AA" alkaline dry cell. Thereafter, a groove was formed at a position 3.7 mm apart from the opening edge of the external can in the height direction. This arrangement is made so that when the sealing member is inserted later, the sealing member is held at the position of the groove so as not to be shoved deeper than the groove position. Moreover, inside the external can, pitch is applied from the opening edge to the position 3.7 mm in depth in the height direction so as to improve the adhering property between the external can and the sealing member.

Next, non-woven cloths, each made of vinylon and rayon having a thickness of 100 μm, were stacked three deep, and rolled into a cup shape to form a separator, and this was inserted inside the preliminarily prepared cylindrical cathode, and these were permeated with 1.5 g of potassium hydroxide at a concentration of 39% serving as an electrolyte solution. Next, 10 4.0 g of zinc powder with a purity of 99.0% that was filtered through a sieve of 425 μm in mesh, but was not filtered through a sieve of 75 μm in mesh, 2.0 g of potassium hydroxide at a concentration of 39% and 0.04 g of polyacrylic acid soda were kneaded to form a paste-shaped anode, and this was inserted inside the separator.

Next, a tin-plated anode collector rod made of brass, used for a collector on the anode, was inserted into a boss section of a sealing member, and the anode collector rod and the anode terminal plate (metal plate) were joined to each other through a spot welding process. The anode terminal plate, used here, was a metal plate 7 of a type schematically shown in FIG. 5, and the average curvature radius r of the curved portion 78b was 0.6 mm, the angle range (θ1) in which the curved section 7c was formed was 150 degrees, and the angle range (θ2) in which the curved section 78b was in contact with the sealing member 6 was 120 degrees. These anode terminal plates were formed by stamping and pressing a nickel plated steel plate having a thickness of 0.4 mm. This anode terminal plate was attached to a sealing member made of nylon 6-6, and these are attached to an external can in which the aforementioned cathode and anode are installed, and the opening edge of the external can is then caulked from outside by a spinning system so that a size "AA" alkaline dry cell, shown in FIG. 1, was formed.

Here, in the above-mentioned Example 5, and Examples 6 and 7 as well as Comparative Examples 3 to 6, which will be described later, a plated steel plate was used as the anode terminal plate in any of the cases, and this is because steel plates are easily processed, have an erosion resistant property, and are inexpensive materials. All the alkaline dry cell commercially available in Japan use plated steel plates of this type. Moreover, the reason that the thickness of these steel plates is set to 0.4 mm is because the thickness of the steel plates of not less than 0.5 mm causes an extreme abrasion in the metal mold when the anode terminal plate is stamped from an original plate, resulting in disadvantages in terms of costs.

EXAMPLE 6

A size "AA" alkaline dry cell is formed in the same manner as Example 5 except that the average curvature radius of the curved portion on the outer circumferential portion of the metal plate (anode terminal plate) is set to 0.8 mm.

EXAMPLE 7

A size "AA" alkaline dry cell is formed in the same manner as Example 5 except that the average curvature radius of the curved portion on the outer circumferential portion of the metal plate (anode terminal plate) is set to 1.0 mm.

COMPARATIVE EXAMPLE 3

Figure 8:
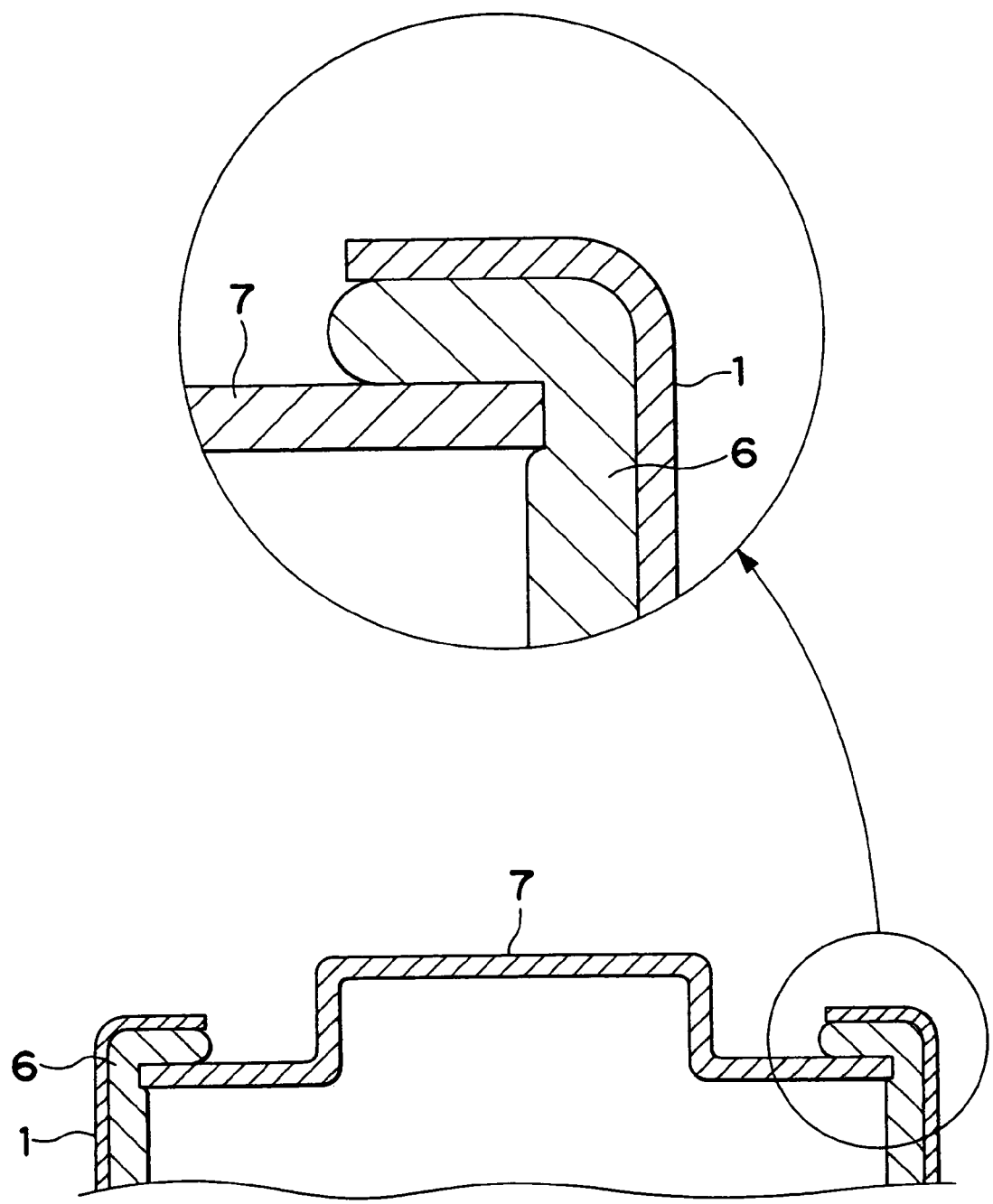
FIG. 8 is a cross-sectional view that schematically shows the structure of its peripheral portion of a metal plate used in Comparative Example 3 of the present invention in a partially omitted manner.

As illustrated in FIG. 8, without forming any curved portion or bent portion on the outer circumferential portion of the metal plate (anode terminal plate) 7, a size "AA" alkaline dry cell is formed in the same manner as Example 5 except that the sealing member 6 is sandwiched between the flat outer circumferential portion of the metal plate 7 and the external can 1 and then caulked.

COMPARATIVE EXAMPLE 4

Figure 9:
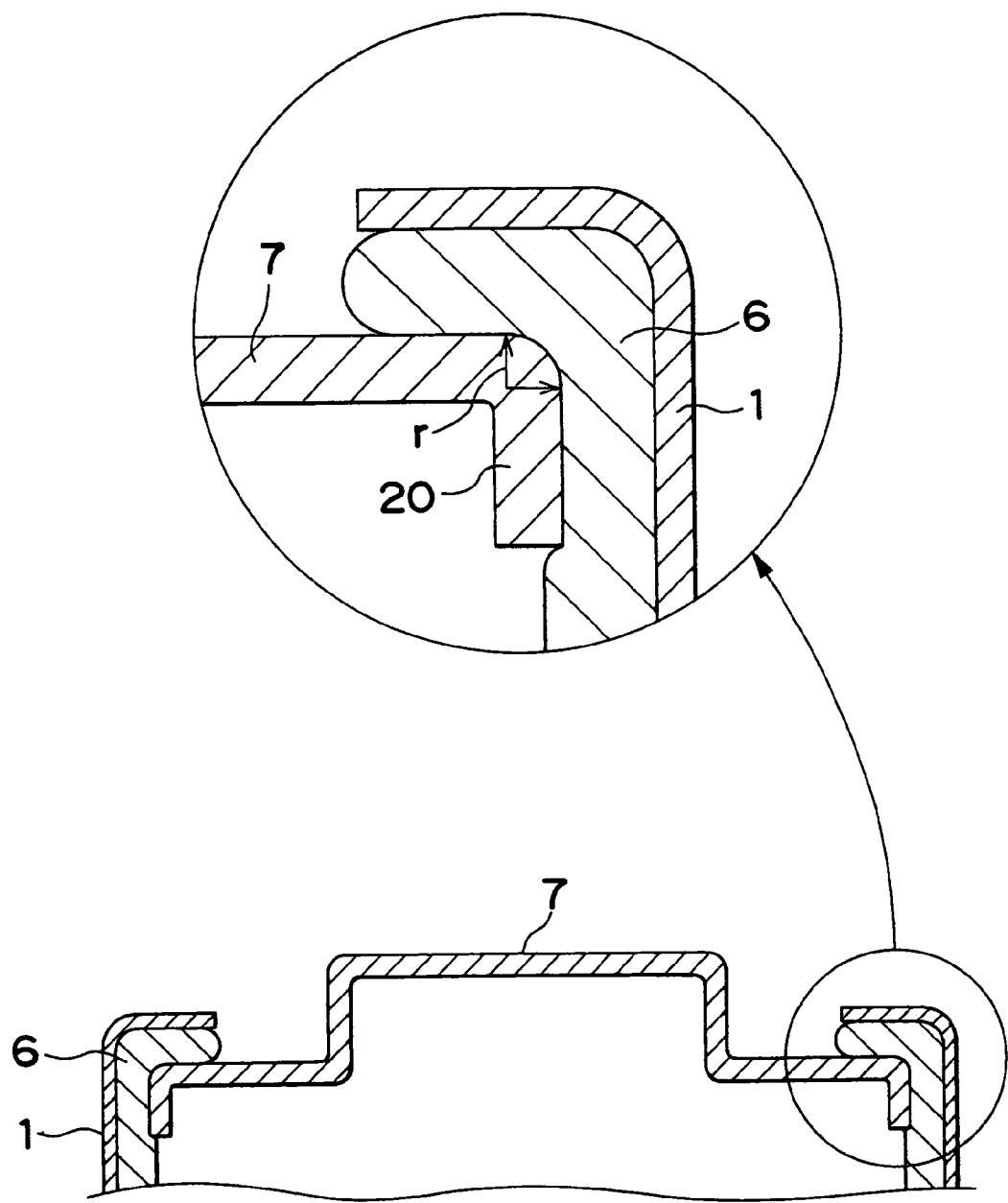
FIG. 9 is a cross-sectional view that schematically shows the structure of its peripheral portion of a metal plate used in Comparative Example 4 in a partially omitted manner.

As illustrated in FIG. 9, a curved portion 20 bent with an angle of 90 degrees is placed on the outer circumferential portion of the metal plate (anode terminal plate) 7, and the sealing member 6 is tightened with this curved portion 20 and the external can 1. Except for these points, a size "AA" alkaline dry cell is formed in the same manner as Example 5. Here, in this case, the outside corner of the bent portion 20 forms a fine curved face, and the average curvature radius r was 0.3 mm.

COMPARATIVE EXAMPLE 5

A size "AA" alkaline dry cell is formed in the same manner as Example 5 except that the average curvature radius r of the curved portion 78b on the outer circumferential portion of the metal plate (anode terminal plate) 7 is set to 1.4 mm.

COMPARATIVE EXAMPLE 6

Figure 10:
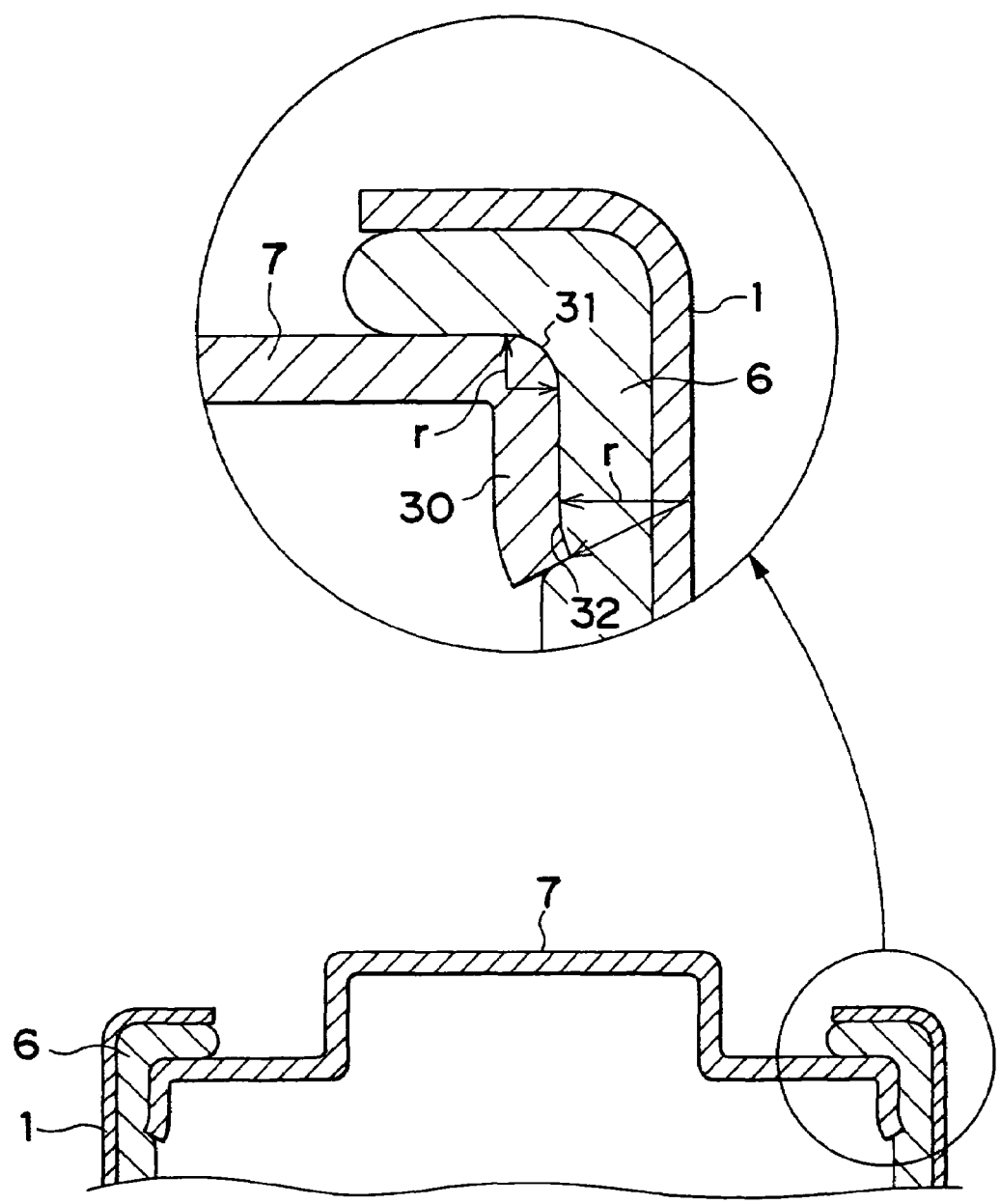
FIG. 10 is a cross-sectional view that schematically shows the structure of its peripheral portion of a metal plate used in Comparative Example 6 in a partially omitted manner.

As illustrated in FIG. 10, on the outer circumferential portion of the metal plate (anode terminal plate) 7 was formed a bent portion 30 that is bent inward with an angle of 90 degrees with the outer circumferential edge being further bent outward slightly, and the sealing member 6 was tightened with this bent portion 30 and the external can 1. Except for these points, the same processes as Example 5 were carried out to form a size "AA" alkaline dry cell. Here, on the outer face side of the bent portion 30 are located a first bent face 31 forming a corner section and a second bent face 32 on the end side, and the average curvature radii r of the bent faces 31 and 32 are respectively 0.3 mm and 0.4 mm.

[Leak Liquid Resisting Test]

Among the batteries related to the respective Examples and Comparative Examples formed as described above, every 100 batteries were stored in a thermostat that repeated temperature changes of −10° C. and 60° C. every 30 minutes, for three days, and after the storage, a check was made as to whether or not there was any leak of the inside strong alkaline solution (electrolyte solution) between the external can and the sealing member by using a cresol red solution as an alkali identification solution. Table 2 shows the results of the tests.

TABLE 2

| | Cross-sectional view of a metal plate | Average curvature radius of a curved portion, etc. installed on the outer circumference of a metal plate (mm) | Angle θ 1 of a curved portion, etc. placed on the outer circumference of the metal plate (degrees) | Angle θ 2 in which the curved portion, etc. are in contact with the sealing edge resin (degrees) | Number of batteries suffering from liquid leak in a thermostat that uses temperature changes of −10° C. and 60° C. (every 100 batteries). |
|---|---|---|---|---|---|
| Example 5 | FIG. 5 | 0.6 | 150 | 120 | 0 |
| Example 6 | FIG. 5 | 0.8 | 150 | 120 | 0 |
| Example 7 | FIG. 5 | 1.0 | 150 | 120 | 0 |
| Comparative Example 3 | FIG. 8 | no bent portion | — | — | 100 |
| Comparative Example 4 | FIG. 9 | 0.3 | 90 | 90 | 54 |
| Comparative Example 5 | FIG. 5 | 1.4 | 150 | 120 | 24 |
| Comparative Example 6 | FIG. 10 | 0.3 and 0.4 | 90 and 45 | 90 and 45 | 2 |

As clearly shown by this Table, in the case of the alkaline dry cell obtained in Examples 5 to 7, even after stored under abrupt temperature changes for a predetermined time, none of them had any liquid leak. In contrast, in the case of the alkaline dry cells obtained in Comparative Example 3, liquid leak was observed in all the batteries among 100 samples, and in the case of the alkaline dry cells obtained in Comparative Example 6, liquid leak was observed in 2 batteries among 100 samples.

EXAMPLE 8

A cathode material, prepared by mixing manganese dioxide obtained through an electrolytic method, graphite and water at a predetermined ratio, and this was inserted into an external can for a size "AA" alkaline dry cell. Thereafter, a groove was formed at a position 3.7 mm apart from the opening edge of the external can in the height direction. This arrangement is made so that when the sealing member is inserted later, it is held at the position of the groove so as not to be shoved deeper than the groove position. Moreover, inside the external can, pitch is applied from the opening edge to the position 3.7 mm in depth in the height direction so as to improve the adhering property between the external can and the sealing member. Next, a separator, rolled into a cup shape, was inserted inside the preliminarily prepared cylindrical cathode, and these were permeated with an electrolyte solution and a paste-shaped anode was then inserted inside the separator.

Figure 11:
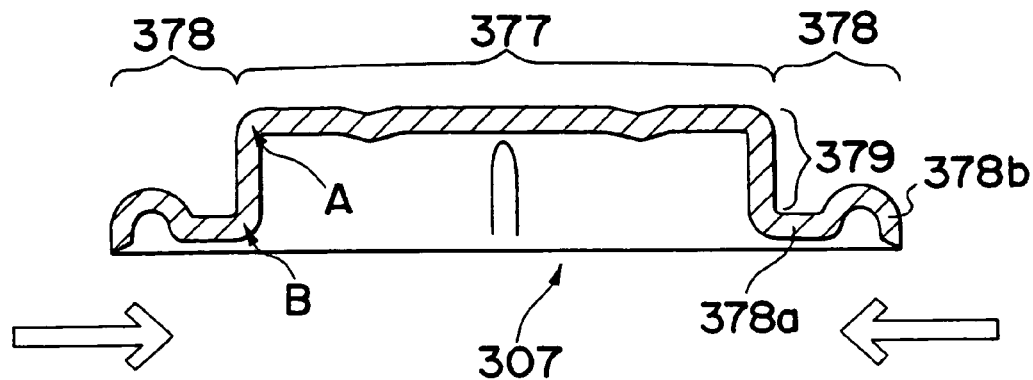
FIG. 11 is a longitudinal cross-sectional view showing an anode terminal plate, which is used so as to explain problems that arise in a sealing edge process.

With respect to the anode terminal plates used for batteries related to Examples of the present invention, those having an angle of 8 degrees between the flange face flat portion and the terminal face (Example 8) and those having an angle of 4 degrees (Example 9) were respectively used, and with respect to those used for batteries related to Comparative Examples, those having an angle of 2 degrees (Comparative Example 7) and those having an angle of 0 degree (Comparative Example 8) were respectively used. With respect to these angles, the direction that increases the angle between the flange face flat portion and the terminal face side face is determined as the positive direction (see FIG. 4). The anode terminal plate shown in FIG. 4 is the same as that used in Example 8, and that shown in FIG. 11 is the same as that used in Comparative Example 8. These anode terminal plates (metal plate) 7, 307, shown in FIGS. 4 and 11 are respectively provided with curved portions 78b, 378b having an average curvature radius of 0.6 mm with an angle of 180 degrees on the periphery thereof, and this arrangement is made to increase the strength of the anode terminal plate through the process curing and also to increase the 5 strength of the caulked portion, and without these curved portions 78b, 378b, the anode terminal plate is weakened in the force for pressing the resin sealing member, making the inner strong alkaline electrolyte solution susceptible to leak outside.

These anode terminal plates were formed by stamping and pressing a nickel plating steel plate having a thickness of 0.4 mm. An anode collector rod was joined to this anode terminal plate through a spot welding process, and attached to a sealing member made of nylon 6—6 (6, 6 nylon), and these were attached to an external can provided with the aforementioned cathode and anode, and the opening edge of the external can was caulked from the outside through a spinning system so that a size "AA" alkaline dry cell as illustrated in FIG. 1 was formed; thus, 100 of these batteries were formed for each of the Examples and Comparative Examples.

Here, in the Examples and Comparative Examples of the present invention, a plated steel plate was used as the anode terminal plate in any of the cases, and this is because steel plates are easily processed, have an erosion resistant property, and are inexpensive materials. All the alkaline dry cells commercially available in Japan use plated steel plates of this type. Moreover, the reason that the thickness of these steel plates is set to 0.4 mm is because thicker steel plates cause an extreme abrasion in the metal mold and an increase in the consumption of steel material, resulting in disadvantages in terms of costs.

The batteries manufactured as described above were transmission X-rayed so as to examine whether the anode terminal plate was raised or lowered before and after the sealing process, and the height was also measured to find a difference between the maximum value and the minimum value of the height. Table 3 shows the results of the tests.

TABLE 3

| | Angle made by terminal face and flange face flat portion | Rate of cases in which the height of the anode terminal plate was raised before and after a sealing edge process | Rate of cases in which the height of the anode terminal plate was lowered before and after a sealing edge process | Difference between the greatest and the smallest of the height of a battery after a sealing edge process |
|---|---|---|---|---|
| Example 8 | 8 degrees | 100% | 0% | 0.03 mm |
| Example 9 | 4 degrees | 100% | 0% | 0.04 mm |
| Comparative Example 7 | 2 degrees | 70% | 30% | 0.47 mm |
| Comparative Example 8 | 0 degrees | 61% | 39% | 0.49 mm |

As shown in Table 3, by providing a slant of not less than 4 degrees on the terminal face and the flange face flat portion, after the sealing edge process, all the anode terminal plates were deformed to become higher than the original height; as a result, it was possible to suppress deviations in the height of the batteries more effectively as compared with Comparative Examples. Here, when the angle made by the terminal face and the flange face flat portion is greater than 4 degrees, the height of the anode terminal plate after a sealing edge process is uniformly set higher than the original height; however, when this angle becomes too great, the height of the anode terminal plate becomes too great, resulting in a reduction in the degree of freedom in designing; thus, it is preferably set to not more than 20 degrees.

EXAMPLE 10

Figure 12:
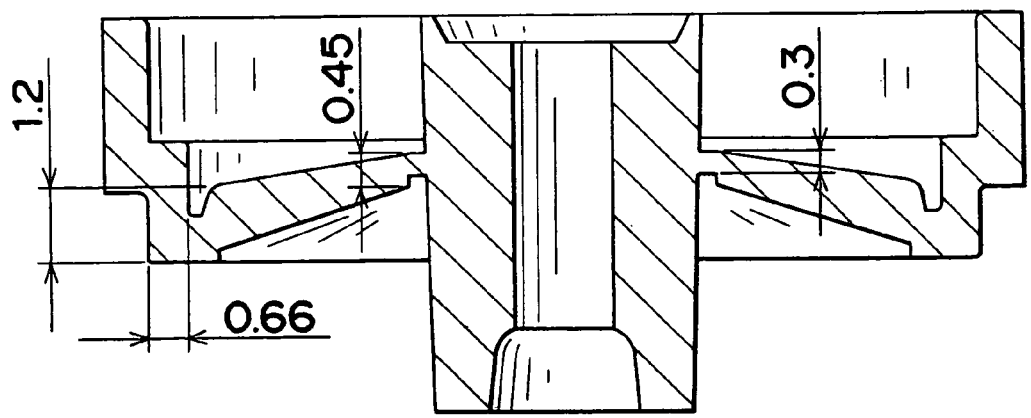
FIG. 12 is a cross-sectional view that shows the structure of a resin sealing member used in Embodiment 10 of the present invention.
Figure 13:
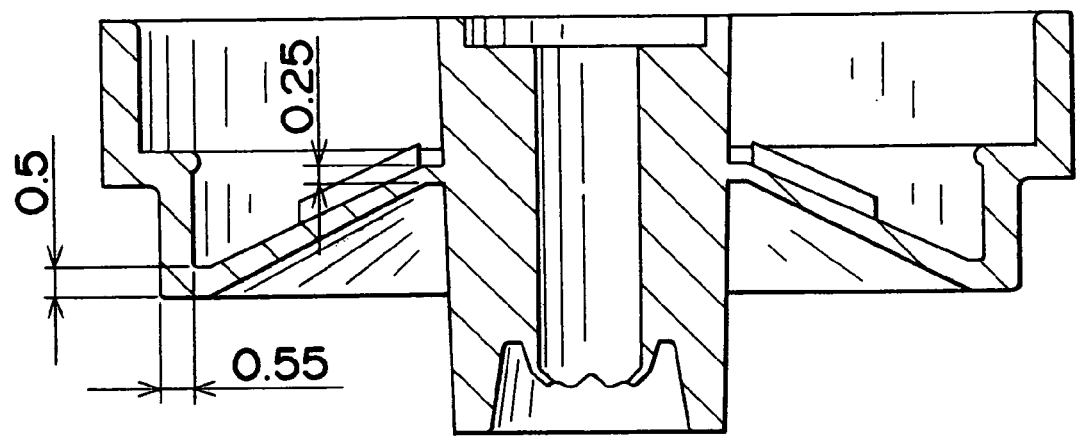
FIG. 13 is a cross-sectional view that shows a structure of a resin sealing member used in Comparative Example 9.

In order to confirm the effects of the resin sealing member in accordance with the present invention, the following experiments were carried out with respect to the resin sealing member used in the size "AA" alkaline battery. In this experiment, in Example 10, a sealing member made of 6,6 nylon as shown in FIG. 12 was used, and in Comparative Example 9, a sealing member made of 6,6 nylon as shown in FIG. 13 was used. In these Figures, the unit of the thickness dimension was millimeter.

1. Analyzing Device Used in the Experiments

3DCAD Pro-Engineer and structure analyzing software Pro-Mechanica (Japan Parametric Technology Co., Ltd.) were used.

2. Test Conditions:

With respect to coordinate axes, polar coordinates having r (radial direction of the sealing member), θ (circumferential direction of the sealing member) and z(axial direction of the boss section) were used.

Figure 14:
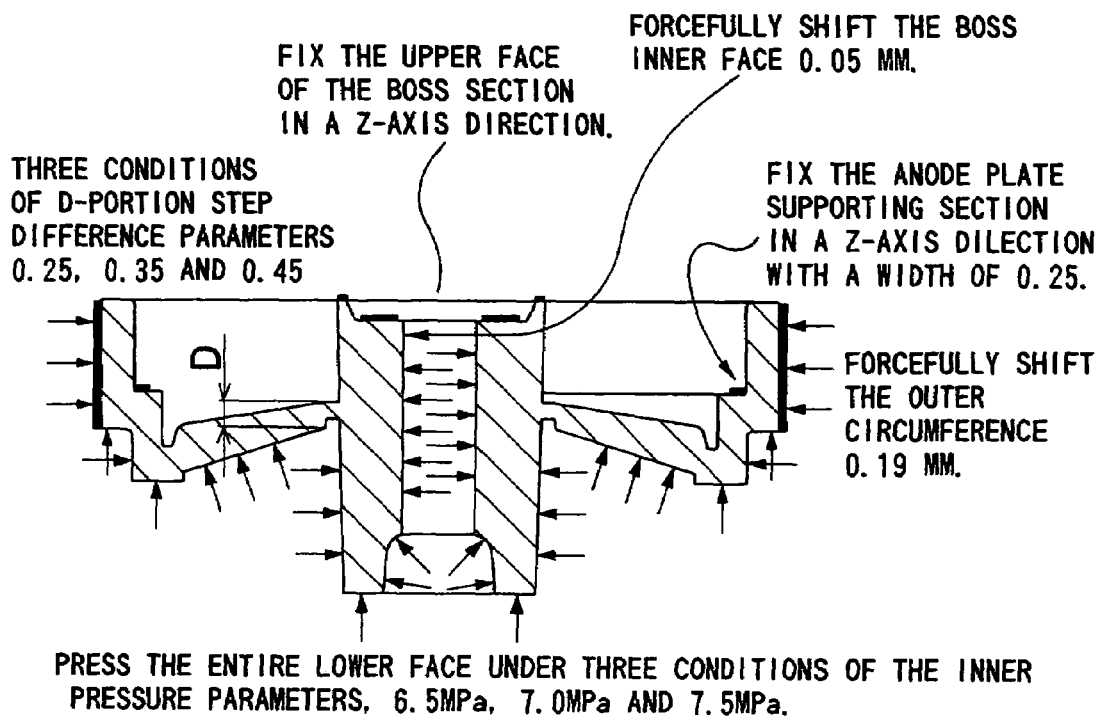
FIG. 14 is an explanatory drawing that describes experimental conditions that are used in Example 10 of the present invention.

(1) Confined Conditions (see FIG. 14):
① Taking into consideration the press insertion of the anode collective rod, the inner diameter of the sealing member boss section was forcefully shifted in the r outward direction by 0.05 mm.
② Taking into consideration the lateral tightening at the time of the spinning sealing edge process, the outer diameter of the sealing member was forcefully shifted by 0.19 mm in the r inward direction.
3 With respect to the upper face of the sealing member boss section, z-direction is fixed, and redirection and θ direction are set free.
④ With respect to the contact face to the anode terminal plate, z-direction is fixed, and redirection and θ direction are set free.

(2) Load Condition;
The entire face of the sealing member lower face was pressed at 6.5 MPa, 7.0 MPa and 7.5 MPa.

(3) Temperature Conditions;
Samples were respectively measured at normal temperature (23° C.) and a high temperature (150° C.).

(4) Dimension Parameters;
With respect to the D portion step difference dimension shown in FIG. 14 (thickness of the first thickness portion), those respectively having 0.25 mm, 0.35 mm and 0.45 mm were prepared, and a check was made as to which was an optimal shape. 3. Measurements and results With the battery inner pressure being raised, the dislocation and the stress distribution of the thin portion of the connecting portion were measured immediately before it was ruptured. As a result, the following facts were obtained.

(1) Displacement and stress distribution at the time of lateral tightening process in the case when the spinning sealing edge process is taken into consideration ① Dislocation;
In any of the sealing members in Example 10 and Comparative Example 9, the greatest displacement occurred on the outer circumferential side in the connecting portion.

② Stress;
In the sealing member of Example 10, a stress concentration occurred on the stress absorbing section placed on the foot portion on the outer circumferential portion side in the connecting portion, no remarkable stress distribution was found in the connecting section. In contrast, in the sealing member of Comparative Example 9, no remarkable stress concentration was observed, and it was found that the stress was received by the entire connecting portion with the connecting portion being deformed as a whole. Moreover, in the case of the sealing member of Comparative Example 9 without any stress absorbing portion, it was confirmed that the stress was concentrated on the anti-explosion thin portion placed on the foot portion on the boss section in the connecting section.

(2) Displacement and stress distribution at an operation time with an inner pressure of 6.5 MPa at normal temperature (23° C.)

① Displacement;
In the sealing member of Example 10, a maximum displacement of 0.24 mm took place from the center of the connecting portion further to the boss section side, and in the sealing member of Comparative Example 9, a maximum displacement of 0.48 mm took place virtually in the center of the connecting portion.

② Stress;
In each of Example 10 and Comparative Example 9, a maximum stress took place on the anti-explosion thin portion in the connecting portion. In the sealing member of Comparative Example 9, the stress tended to scatter to the foot portion of the rib placed on the upper face of the connecting portion.

(3) Displacement and stress distribution at an operation time with an inner pressure of 6.5 MPa at a high temperature (150° C.)

① Displacement;
In the same manner as a normal temperature time, in the sealing member of Example 10, a maximum displacement of 0.91 mm took place from the center of the connecting portion further to the boss section side, and in the sealing member of Comparative Example 9, a maximum displacement of 1.90 mm took place virtually in the center of the connecting portion.

(2) Stress;
In each of Example 10 and Comparative Example 9, a maximum stress took place on the anti-explosion thin portion in the connecting portion. In the sealing member of Comparative Example 9, the stress scattered to the foot portion of the rib placed on the upper face of the connecting portion, and tended to further have a deformation in the shape of a necking.

(4) Relationship between an increase in the inner pressure (increase in the operation pressure in the safety valve) and the maximum displacement of the connecting portion In the sealing member of Comparative Example 9, at the time of the safety valve maximum operation pressure 6.5 MPa, the maximum displacement of the connecting portion at the high temperature time was 1.9 mm. In contrast, in the sealing member of Example 10, even when the inner pressure (safety valve operation pressure) increased to 7.5 MPa, the connecting portion maximum displacement was 1.13 mm so that it was confirmed that the contact against the anode terminal plate could be avoided and prevented even at the high-temperature time.

(5) Relationship between the thickness of the first thick portion and the displacement. In order to set the maximum displacement of the connecting portion to not more than 1.2 mm so as to prevent it from contacting the anode terminal plate at the time of a high temperature, the thickness of the first thick portion needs to be set to 0.45 mm, although this is dependent on the setting of the inner pressure (maximum safety valve operation pressure).

4. Evaluation
Based upon the above-mentioned results, the following evaluation can be made:

(1) Concerning the displacement and stress distribution at the time of the lateral tightening when the spinning sealing edge process is taken into consideration.

In the sealing member of Example 10, since the stress absorbing portion for absorbing a stress caused by the lateral tightening is placed on the connecting portion, it is possible to reduce the load imposed on the anti-explosion thin portion.

(2) Concerning the displacement and stress distribution at the time of an operation with an inner pressure of 6.5 Mpa.

At normal temperature (23° C.), each of the sealing members of Example and Comparative Example 9 has an amount of displacement in which the safety valve is operable (with an amount of displacement required for the connecting portion of the sealing member to contact the anode terminal plate being set to 1.2 mm). However, at the time of a high temperature (150° C.), the maximum amount of displacement in the connecting portion of the sealing member of Comparative Example 9 is 1.9 mm; therefore, the sealing member comes to contact the anode terminal plate prior to the actuation of the safety valve. Moreover, it is considered that the shape of the connecting portion 5 having a necking causes an extension due to the thinness of the thickness of the connecting portion. It is considered that because of these points, there are some cases in which the sealing member comes to form a dome shape. In contrast, it is assumed that in the case of the sealing member of Example 10, the maximum amount of displacement in the connecting portion is 0.91 mm, and this allows the safety valve to actuate before the sealing member has come into contact with the anode terminal plate.

(3) Concerning a rupture of the sealing member in a dented state at the time of an excessive discharging state.

With respect to the main reasons for a rupture of the sealing member in a dented state at the time of an excessive discharging state, the fact that the connecting portion of the sealing edge is thin and that the thinness causes a great amount of displacement in the connecting portion is listed; and based upon the results of the above-mentioned experiments, it is possible to reduce the amount of displacement in the connecting portion by the application of the sealing member of Example 10 having a thicker connecting portion as compared with Comparative Example 9. Moreover, in comparison with the sealing member of Example 10 and the sealing member of Comparative Example 9 in relation to the inner stress of the connecting portion, the sealing member of Example 10 makes it possible to reduce the inner stress to approximately 60% of that of the sealing member of Comparative Example 9. Therefore, the sealing member of Example 10 makes it possible to also eliminate the rupture of the sealing member at the time of an excessive discharging state by the reduction of the inner stress of the connecting portion.

(4) Concerning improvements of the safety valve operation pressure and shape of the sealing member. In the above-mentioned experiments, on the assumption that the displacement and stress distribution of the sealing member connecting portion are mainly dependent on the thickness of the connecting portion, the analysis has been made by using the D portion step difference dimension (thickness of the first thick portion) as a parameter. Taking it into consideration that the amount of displacement taken up to the contact of the sealing member connecting portion to the anode terminal plate is 1.2 mm, the D portion step difference dimension can be reduced to 0.35 mm in the specification of the current sealing member (Comparative Example 9) with the safety valve operation pressure being set 6.5 MPa at maximum; however, it is impossible to set the maximum setting value of the safety valve operation pressure to 7.0 MPa. In order to improve the maximum setting value of the safety valve operation pressure, the D portion step difference dimension needs to be set to 0.45 mm as in the case of the sealing member of Example 10.

What is claimed is:

1. An alkaline dry cell comprising:
a cathode and an anode, a separator placed between said cathode and said anode and an electrolyte solution that are housed inside an external can having a cylindrical shape with a bottom, and a resin sealing member and a supporting member for supporting said sealing member with an inner circumferential side that are attached to an opening edge of the external can,
wherein the opening edge of the external can is sealed by tightening the resin sealing member with the external can and the supporting member,
wherein a sheet of metal plate that also serves as an anode terminal plate is used as the supporting member,
wherein the resin sealing member comprises a boss section holding an anode collector rod to be inserted to the center portion of the anode, an outer circumferential portion which is supported by the supporting member with the inner circumferential side so as to contact the inner circumferential face of the external can, and a connecting portion for connecting the boss section and the outer circumferential portion,
wherein an anti-explosion thin portion is installed on a foot portion on the boss section side in the connecting portion of the resin sealing member, and a stress absorbing portion, which absorbs one portion of the stress exerting on the connecting portion so as not to allow the stress to concentrate on the anti-explosion thin portion when the resin sealing member is tightened to seal the opening edge of the external can, is placed on a foot portion on the outer circumferential portion side,
wherein said stress absorbing portion is formed in such a manner that its thickness becomes thinner discontinuously as compared with a portion positioned right inner circumferential side thereof, with a step difference placed between it and the portion positioned right inner circumferential side thereof.

2. An alkaline dry cell comprising:
a cathode and an anode, a separator placed between said cathode and said anode and an electrolyte solution that are housed inside an external can having a cylindrical shape with a bottom, and a resin sealing member and a supporting member for supporting said sealing member with an inner circumferential side that are attached to an opening edge of the external can,
wherein the opening edge of the external can is sealed by tightening the resin sealing member with the external can and the supporting member,
wherein a sheet of metal plate that also serves as an anode terminal plate is used as the supporting member,
wherein the resin sealing member comprises a boss section holding an anode collector rod to be inserted to the center portion of the anode, an outer circumferential portion which is supported by the supporting member with the inner circumferential side so as to contact the inner circumferential face of the external can, and a connecting portion for connecting the boss section and the outer circumferential portion,
wherein an anti-explosion thin portion is installed on a foot portion on the boss section side in the connecting portion of the resin sealing member in a manner so as to have a thickness that becomes discontinuously thinner as compared with a first thickness portion located right outside this in a manner so as to surround the thin portion with a step difference from the first thickness portion, and a stress absorbing portion, which absorbs one portion of the stress exerting on the connecting portion so as not to allow the stress to concentrate on the anti-explosion thin portion when the resin sealing member is tightened to seal the opening edge of the external can, is placed on a foot portion on the outer circumferential portion side in the connecting portion, wherein said stress absorbing portion is formed in such a manner that its thickness becomes thinner discontinuously as compared with a second thickness portion positioned right inner circumferential side thereof, with a step difference being placed between it and the second thickness portion, wherein said connecting portion has a portion reaching to the second thickness portion from the first thickness portion, which becomes continuously thicker from the first thickness portion toward the second thickness portion.

3. The alkaline dry cell according to claim 2, wherein the thickness of the first thickness portion is set to ranging from 0.4 mm to 0.5 mm, and the second thickness portion is set to ranging from 2.5 times to 3.0 times greater than the first thickness portion.

4. An alkaline dry cell comprising:

a cathode and an anode, a separator placed between said cathode and said anode and an electrolyte solution that are housed inside an external can having a cylindrical shape with a bottom, and a resin sealing member and a supporting member for supporting said sealing member with an inner circumferential side that are attached to an opening edge of the external can, wherein the opening edge of the external can is sealed by tightening the resin sealing member with the external can and the supporting member, wherein the thickness of a trunk portion of the external can is made thinner than 0.18 mm, and the thickness of the sealing edge portion of the external can is made 1.4 times greater than the thickness of the trunk portion, wherein a sheet of metal plate that also serves as an anode terminal plate is used as the supporting member, wherein the resin sealing member comprises a boss section holding an anode collector rod to be inserted to the center portion of the anode, an outer circumferential portion which is supported by the supporting member with the inner circumferential side so as to contact the inner circumferential face of the external can, and a connecting portion for connecting the boss section and the outer circumferential portion, wherein an anti-explosion thin portion is installed on a foot portion on the boss section side in the connecting portion of the resin sealing member, and a stress absorbing portion, which absorbs one portion of the stress exerting on the connecting portion so as not to allow the stress to concentrate on the anti-explosion thin portion when the resin sealing member is tightened to seal the opening edge of the external can, is placed on a foot portion on the outer circumferential portion side, wherein said stress absorbing portion is formed in such a manner that its thickness becomes thinner discontinuously as compared with a portion positioned right inner circumferential side thereof, with a step difference placed between it and the portion positioned right inner circumferential side thereof.

5. An alkaline dry cell comprising:

a cathode and an anode, a separator placed between said cathode and said anode and an electrolyte solution that are housed inside an external can having a cylindrical shape with a bottom, and a resin sealing member and a supporting member for supporting said sealing member with an inner circumferential side that are attached to an opening edge of the external can, wherein the opening edge of the external can is sealed by tightening the resin sealing member with the external can and the supporting member, wherein the thickness of a trunk portion of the external can is made thinner than 0.18 mm, and the thickness of the sealing edge portion of the external can is made 1.4 times greater than the thickness of the trunk portion, wherein a sheet of metal plate that also serves as an anode terminal plate is used as the supporting member, wherein the resin sealing member comprises a boss section holding an anode collector rod to be inserted to the center portion of the anode, an outer circumferential portion which is supported by the supporting member with the inner circumferential side so as to contact the inner circumferential face of the external can, and a connecting portion for connecting the boss section and the outer circumferential portion, wherein an anti-explosion thin portion is installed on a foot portion on the boss section side in the connecting portion of the resin sealing member in a manner so as to have a thickness that becomes discontinuously thinner as compared with a first thickness portion located right outside this in a manner so as to surround the thin portion with a step difference from the first thickness portion, and a stress absorbing portion, which absorbs one portion of the stress exerting on the connecting portion so as not to allow the stress to concentrate on the anti-explosion thin portion when the resin sealing member is tightened to seal the opening edge of the external can, is placed on a foot portion on the outer circumferential portion side in the connecting portion, wherein said stress absorbing portion is formed in such a manner that its thickness becomes thinner discontinuously as compared with a second thickness portion positioned right inner circumferential side thereof, with a step difference being placed between it and the second thickness portion, wherein said connecting portion has a portion reaching to the second thickness portion from the first thickness portion, which becomes continuously thicker from the first thickness portion toward the second thickness portion.

6. The alkaline dry cell according to claim 5, wherein the thickness of the first thickness portion is set to ranging from 0.4 mm to 0.5 mm, and the second thickness portion is set to ranging from 2.5 times to 3.0 times greater than the first thickness portion.

* * * * *